(12) United States Patent
Kaneko

(10) Patent No.: US 11,493,108 B2
(45) Date of Patent: Nov. 8, 2022

(54) DAMPER AND OPERATION UNIT

(71) Applicant: OILES CORPORATION, Tokyo (JP)

(72) Inventor: Ryohei Kaneko, Fujisawa (JP)

(73) Assignee: OILES CORPORATION, Tokyo (JP)

(*) Notice: Subject to any disclaimer, the term of this patent is extended or adjusted under 35 U.S.C. 154(b) by 338 days.

(21) Appl. No.: 16/637,330

(22) PCT Filed: Aug. 16, 2018

(86) PCT No.: PCT/JP2018/030416
§ 371 (c)(1),
(2) Date: Feb. 7, 2020

(87) PCT Pub. No.: WO2019/039377
PCT Pub. Date: Feb. 28, 2019

(65) Prior Publication Data
US 2020/0362937 A1 Nov. 19, 2020

(30) Foreign Application Priority Data
Aug. 23, 2017 (JP) .............................. JP2017-160650

(51) Int. Cl.
*F16F 13/02* (2006.01)
*B60K 26/02* (2006.01)

(52) U.S. Cl.
CPC ............ *F16F 13/02* (2013.01); *B60K 26/021* (2013.01); *F16F 2230/0064* (2013.01); *F16F 2230/14* (2013.01)

(58) Field of Classification Search
CPC ............... F16F 13/02; F16F 2230/0064; F16F 2230/14; F16F 7/02; B60K 26/021
(Continued)

(56) References Cited

U.S. PATENT DOCUMENTS

| 6,464,052 B1* | 10/2002 | Hsiao | ........................ | F16F 9/14 |
| | | | | 188/293 |
| 7,428,952 B2* | 9/2008 | Miyamoto | ................ | F16F 7/04 |
| | | | | 188/293 |

(Continued)

FOREIGN PATENT DOCUMENTS

| CN | 104220953 | 12/2014 |
| CN | 104847827 | 8/2015 |

(Continued)

OTHER PUBLICATIONS

International Search Report for PCT/JP2018/030416 dated Sep. 18, 2018, 4 pages.
(Continued)

*Primary Examiner* — Xuan Lan Nguyen
(74) *Attorney, Agent, or Firm* — Nixon & Vanderhye P.C.

(57) ABSTRACT

Provided is a damper capable of damping a moving member which reciprocates along an axis, using a damping force having a hysteresis property.
A damper includes a cylindrical housing into which a push rod is to be inserted in the direction of an axis thereof, and a damping mechanism placed in the housing and capable of damping the push rod by a damping force having a hysteresis property, wherein the damper is to be attached using a master cylinder mount space of a clutch pedal unit. In the damping mechanism of the damper, engagement between a helical cam groove formed in an inner wall of the housing and a guide protrusion formed on an outer circumference of a rotatable friction disk causes reciprocating linear motion of the push rod to be converted into rotating motion of the rotatable friction disk, and other friction disks, placed on both sides of the rotatable friction disk are pressed against respective sliding surfaces, of the rotating friction disk by an (Continued)

elastic force of a coil spring depending on an amount of displacement of the push rod.

14 Claims, 18 Drawing Sheets

(58) Field of Classification Search
USPC .................................................... 188/290
See application file for complete search history.

(56) References Cited

U.S. PATENT DOCUMENTS

| 7,484,266 B1 * | 2/2009 | Yang .................. H04M 1/0216 |
| | | 188/290 |
| 2014/0217658 A1 | 8/2014 | Kumazawa et al. |
| 2015/0013494 A1 | 1/2015 | Arigaya et al. |
| 2015/0273988 A1 | 10/2015 | Yamazaki |

FOREIGN PATENT DOCUMENTS

| EP | 386494 A * | 9/1990 | ........... A47C 1/0246 |
| EP | 943835 A2 * | 9/1999 | ........... B60K 26/021 |
| JP | 63-141888 | 6/1988 | |
| JP | 2002-12052 | 1/2002 | |
| JP | 4905078 | 3/2012 | |
| JP | 2013-203165 | 10/2013 | |
| JP | 2015-182686 | 10/2015 | |
| JP | 2016-148443 | 8/2016 | |
| WO | 2013/031302 | 3/2013 | |
| WO | 2016/208461 | 12/2016 | |

OTHER PUBLICATIONS

Written Opinion of the ISA for PCT/JP2018/030416 dated Sep. 18, 2018, 5 pages.
Search Report issued in CN App. No. 201880053517.3 dated Mar. 11, 2021 (w/ partial translation).

* cited by examiner

Fig. 10
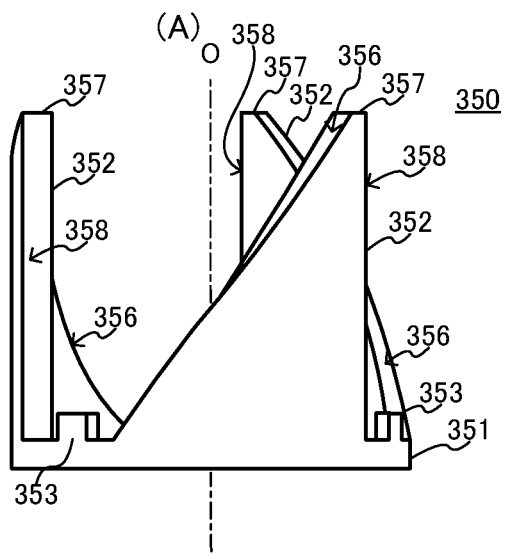
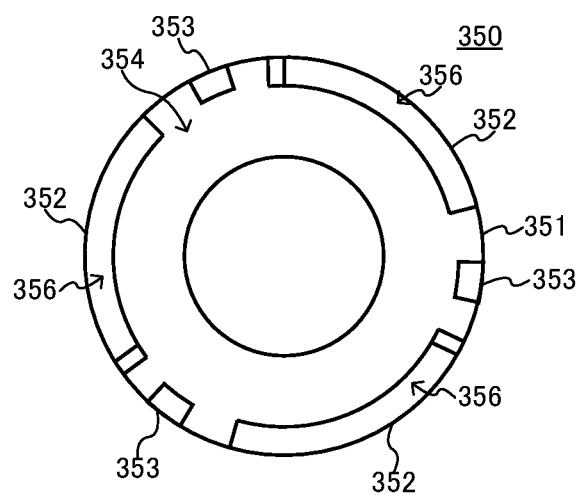
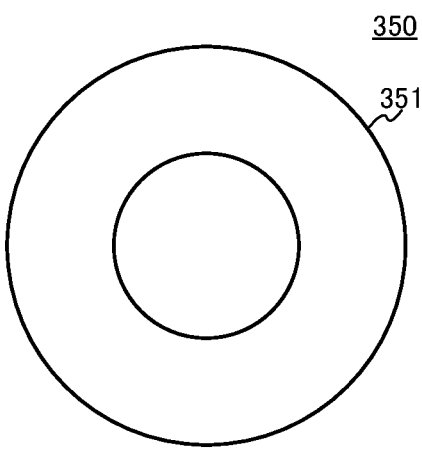

Fig. 13
(A)
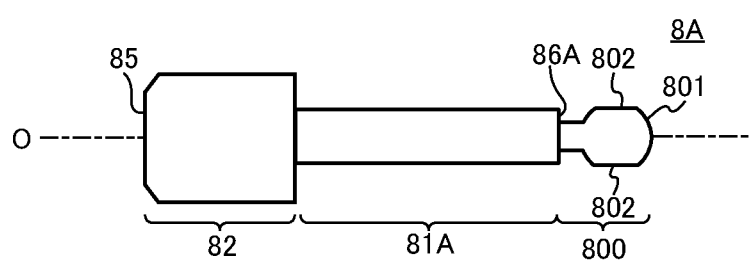
(B)
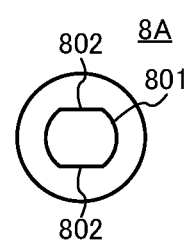

DAMPER AND OPERATION UNIT

This application is the U.S. national phase of International Application No. PCT/JP2018/030416 filed Aug. 16, 2018 which designated the U.S. and claims priority to JP Patent Application No. 2017-160650 filed Aug. 23, 2017, the entire contents of each of which are hereby incorporated by reference.

TECHNICAL FIELD

The present invention relates to a linear motion type of friction generation mechanism having a hysteresis property, and relates to, for example, a linear motion type damper capable of achieving more comfortable pedal operational feeling in a system for transmitting a pedal-operation given by user, to an actuator in the form of electrical signal, such as a clutch by wire system of a vehicle.

BACKGROUND ART

Patent Literature 1 discloses an accelerator pedal unit that uses a hysteresis property of a damper including a pair of cams to give a suitable load in reaction to depression of an accelerator pedal and to reduce a strain on driver's foot that keeps a position of the accelerator pedal almost constant.

In this accelerator pedal unit, a rotation of an accelerator pedal arm is transmitted to a rotary damper, thereby damping the rotation of the accelerator pedal arm in both directions. In particular, a rotation axis of the accelerator pedal arm is extended and the rotary damper is mounted to this rotation axis so that the rotation of the accelerator pedal arm can activate the rotary damper. This makes the rotation axis of the accelerator pedal arm double as a rotation axis of the rotary damper; and therefore the rotation of the accelerator pedal arm causes the rotation axis of the rotary damper to rotate in a direction depending on a direction of the rotation of the accelerator pedal arm, and hysteresis property of the rotary damper gives a suitable load upon depression of the accelerator pedal and reduces the load upon return of the accelerator pedal.

CITATION LIST

Patent Literature

Patent Literature 1: Japanese Unexamined Patent Application Laid-Open No. 2002-12052

SUMMARY OF INVENTION

Technical Problem

When an attempt is made to achieve, for a clutch by wire system as well, such a pedal operational feeling that the driver's foot is given the suitable load upon depression of the pedal but meanwhile the strain on the driver's foot during holding the pedal reduces, the clutch by wire system needs mounting thereon a special clutch pedal unit having a built-in rotary damper similar to that of the conventional accelerator pedal unit as described above.

Mounting the rotary damper on the clutch pedal unit as with the conventional accelerator pedal unit as described above, however, results in upsizing the clutch pedal unit by an amount as large as a space for mounting the rotary damper, in a direction of a rotation axis of a clutch pedal arm. Consequently, in order to mount such clutch pedal unit on an automobile, a larger mount space needs to be secured.

Introduction of clutch by wire system, meanwhile, makes a master cylinder unnecessary, and it is useful that a mount space for the master cylinder becomes directly available for the mount space for the damper.

The present invention has been made in view of the above situation, and one object of the present invention is to provide a damper capable of damping a movable member reciprocating along an axis, by a damping force with hysteresis property. Still another object is to provide a compact operation unit having a structure that allows a space corresponding to a master cylinder mount space to be used as a damper mount space.

Solution to Problem

In response to the above issue, the present invention provides a damper for damping a movable member along an axis, and the damper includes the followings:

a housing in a cylindrical shape, which has an inner wall that is to surround the movable member about the axis and that is provided with a cam groove in a helical form winding about the axis;

a friction generating section placed in the housing and movable with the movable member along the axis; and an elastic member placed in the housing, which is to urge the friction generating section by an elastic force depending on an amount of displacement of the movable member, in a direction of pressing the friction generating section against the movable member.

the friction generating section includes the followings:

a first friction member capable of being displaced toward the elastic member in response to a force from the movable member;

a second friction member capable of being displaced toward the elastic member to compress the elastic member;

and a third friction member having an outer peripheral surface provided with a guide protrusion inserted in the cam groove, which is capable of moving with the first and second friction members along the axis while being pressed between the first and second friction members, and of being rotated by the guide protrusion guided through the cam groove.

Further, the present invention provides an operation unit, and the operation unit includes the followings:

an operation member movable in response to an operation given by user;

the above damper placed in a direction of moving the operation member with the operation, relative to the operation member; and a movable member placed between the operation member and the damper, which is to reciprocate axially due to a motion of the operation member and to be damped by the damper.

Advantageous Effects of Invention

According to the present invention, in the damper, a linear reciprocating motion of the movable member is transformed into a rotational motion of the friction member, another friction member is pressed against this friction member by the elastic force depending on the amount of displacement of the movable member, and this causes the damping force with hysteresis property (a reaction force to vary in magnitude between in a forward stroke and in a backward stroke) to be given the movable member in motion along an axis. In addition, utilizing a space corresponding to a master cylinder mount space of the operation unit as a mount space for this damper achieves a compact operation unit.

BRIEF DESCRIPTION OF DRAWINGS

FIG. 10(A), FIG. 10(B), and FIG. 10(C) are respectively a front view, a plan view, and a bottom view, of a liner member 350.

FIG. 13(A) and FIG. 13(B) are respectively a front view and a right side view of the push rod 8A with a ball joint 800 attached to a front end face 86A.

DESCRIPTION OF EMBODIMENTS

In the following, one embodiment of the present invention will be described with reference to the drawings. The present embodiment includes, as an example, a damper 100 to be incorporated as part into a clutch pedal unit of a clutch by wire system.

Figure 1:
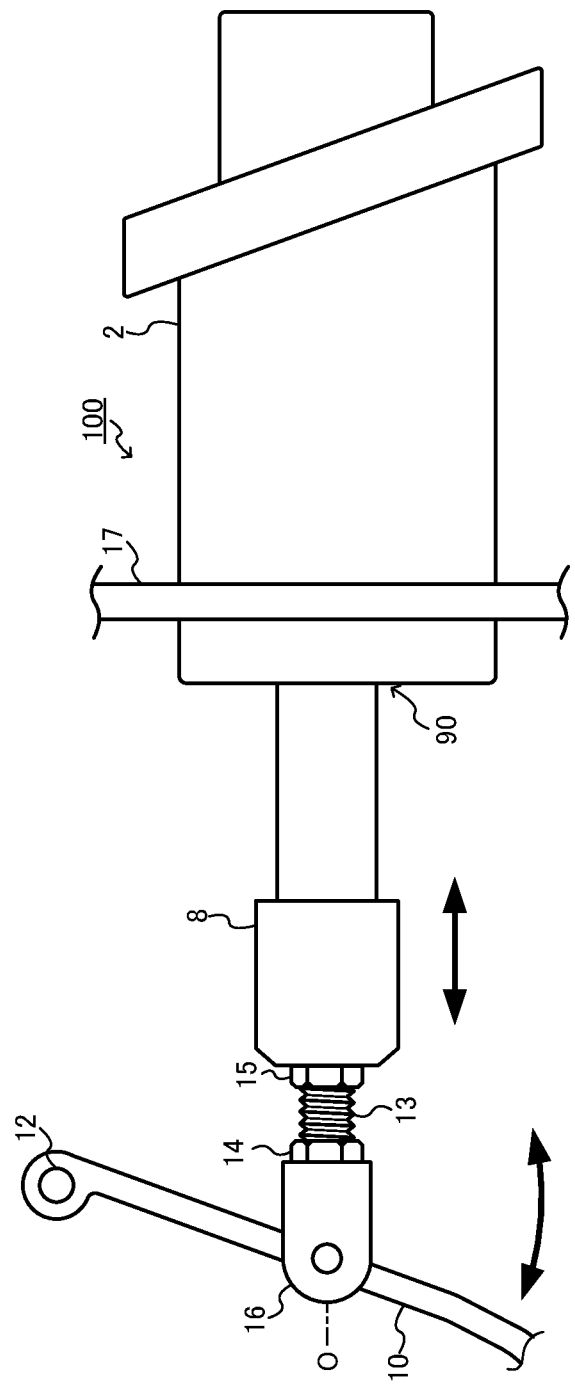
FIG. 1 is a schematic view illustrating a positional relationship between a clutch pedal arm 10 and a damper 100 in a clutch pedal unit with the damper 100 incorporated as part, according to one embodiment of the present invention.
Figure 2:
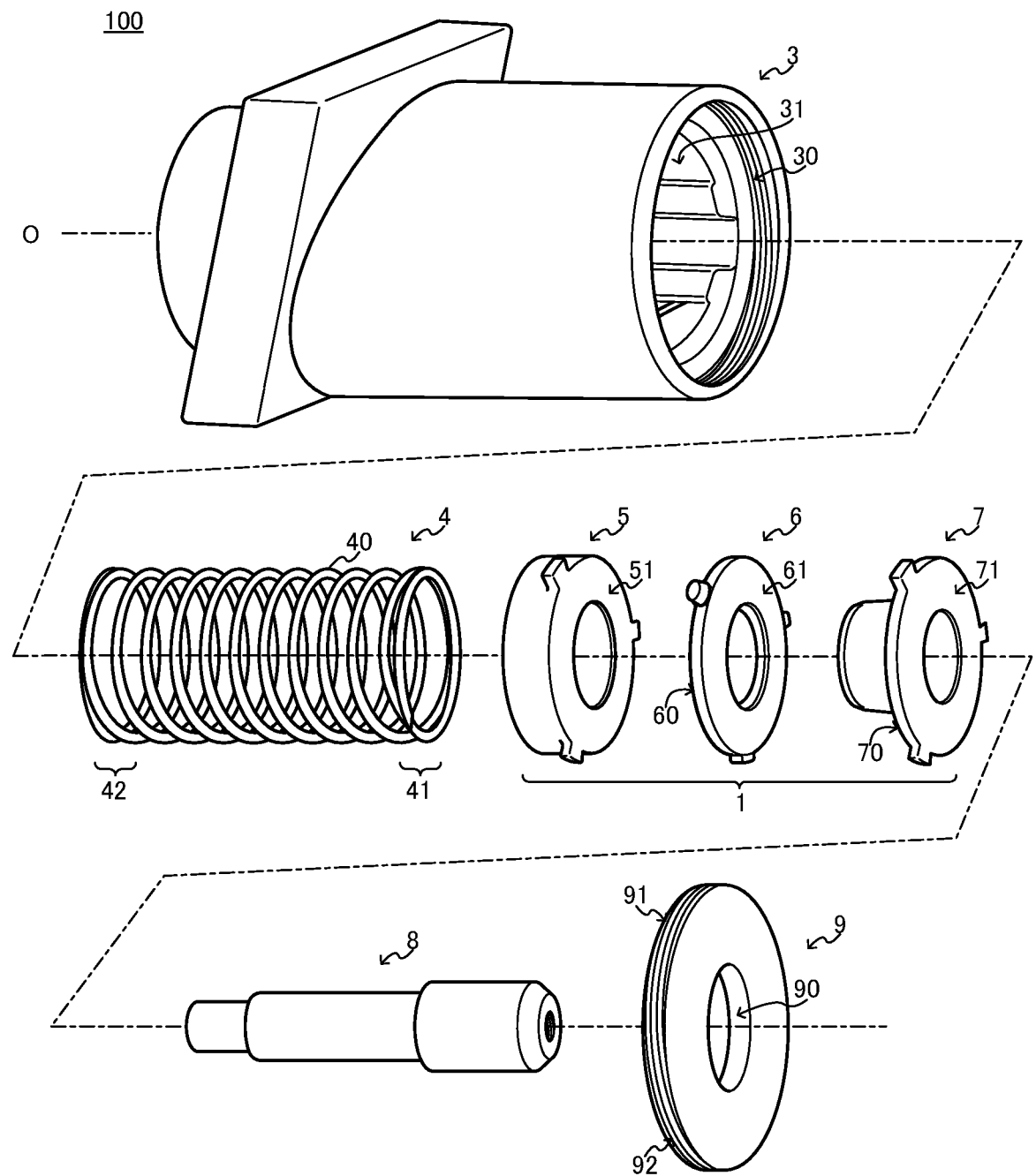
FIG. 2 is an illustrated parts breakdown of the damper 100, to which a push rod 8, however, is added.

FIG. 1 is a schematic view illustrating a positional relationship between a clutch pedal arm 10 and the damper 100 in the clutch pedal unit according to the present embodiment, and FIG. 2 is an illustrated parts breakdown of the damper 100 according to the present embodiment, however, to which a push rod 8 is added.

As illustrated in the figures, the damper 100 according to the present embodiment is a linear motion type damper to be mounted under a clutch pedal arm 10 (at a position in a direction where depressing a clutch pedal moves the clutch pedal arm 10) capable of swinging about a rotation axis 12 depending on depressing operations of the clutch pedal and to support a push rod 8 with one end (a pedal arm connecting section 82 as described below) coupled on the clutch pedal arm 10 so as to allow the push rod 8 to reciprocate along an axis O of this push rod 8; and includes a cylindrical housing 2 into which another end side (a front end side) of the push rod 8 is to be inserted through a rod insertion opening 90 in direction of its axis O and a damping mechanism housed in the inside (a damping mechanism holding space 20 as described below) of the housing 2 so as to damping the push rod 8 by a damping force with a hysteresis property. Such damper 100 has a cylindrical external shape similar to that of a master cylinder of a conventional hydraulic clutch, thereby allowing to be attached to a bracket 17 of the clutch pedal unit by utilization of a mount space for a master cylinder no longer needed because of an introduction of the clutch by wire, namely a dead space.

Here, the housing 2, for example, includes a hollow cylindrical casing 3 with a bottom, having an inner wall 31 provided with helical cam grooves 33 to surround the push rod 8 about the axis O, and a cover 9 closing an opening 30 of this casing 3; the inside of which is provided with a cylindrical space (hereinafter referred to as "a damping mechanism holding space) 20 enclosed by the inner wall 31 and a bottom part 32 of the casing 3 and a back surface 91 (a surface directed to the bottom part 32 of the casing 3) of the cover 9, as a space (See FIG. 8) for holding the damping mechanism.

The damping mechanism, meanwhile, includes a friction generating section 1 capable of occurring a friction between friction disks 5 to 7 while reciprocating with the push rod 8 along an axis O of the damping mechanism holding space 20, and an elastic member 4 placed between the friction generating section 1 and the bottom part 32 of the casing 3 so as to urge the friction generating section 1 as one unit toward the cover 9 by an elastic force depending on an amount of displacement of the push rod 8 (an amount of displacement of the friction generating section 1). Any member may be used as the elastic member 4, as long as it has a proper elastic coefficient and is capable of urging the friction generating section 1 as one unit toward the cover 9 throughout an entire stroke of the push rod 8: the present embodiment uses a coil spring 40 as this elastic member 4.

The friction generating section 1 has a plurality of friction disks 5 to 7 stacking on one end part 41 of the coil spring 40 in a direction of the axis O of the damping mechanism holding space 20; and causes relative rotation between these friction disks 5 to 7 using the helical cam grooves 33 on the inner wall 31 of the casing 3, thereby generating, between sliding surfaces of adjacent friction disks, a friction depending on an amount of displacement of the push rod 8. For example, the friction generating section 1 includes as such friction disks 5 to 7, a friction disk 5 placed on one end part 41 of the coil spring 40, a friction disk 7 placed on a front end part (a small diameter section 84 in a shaft section 81 as described below) of the push rod 8, and a rotatable friction disk 6 interposed between these two friction disks 5, 7 and meshing with the cam grooves 33 of the inner wall 31 of the casing 3 to rotate about the axis O of the damping mechanism holding space 20.

The damper 100 with such a structure, in a posture such that the damping mechanism acts in conjunction with the push rod 8, is incorporated as part into the clutch pedal unit by utilizing a master cylinder mount space no longer needed because of an introduction of the clutch by wire system, thereby causing the damping force with hysteresis property (a reaction force to vary in magnitude between in a forward stroke and in a backward stroke) appropriate for an intended pedal operational feeling to be applied to the push rod 8 in reciprocating motion in the direction of the axis O of the damping mechanism holding space 20 in response to depressing the clutch pedal. The push rod 8 to be damped and respective components (the housing 2 and the damping mechanism) for this damper 100 will be each described in detail below.

(1) The Push Rod 8

Figure 3:
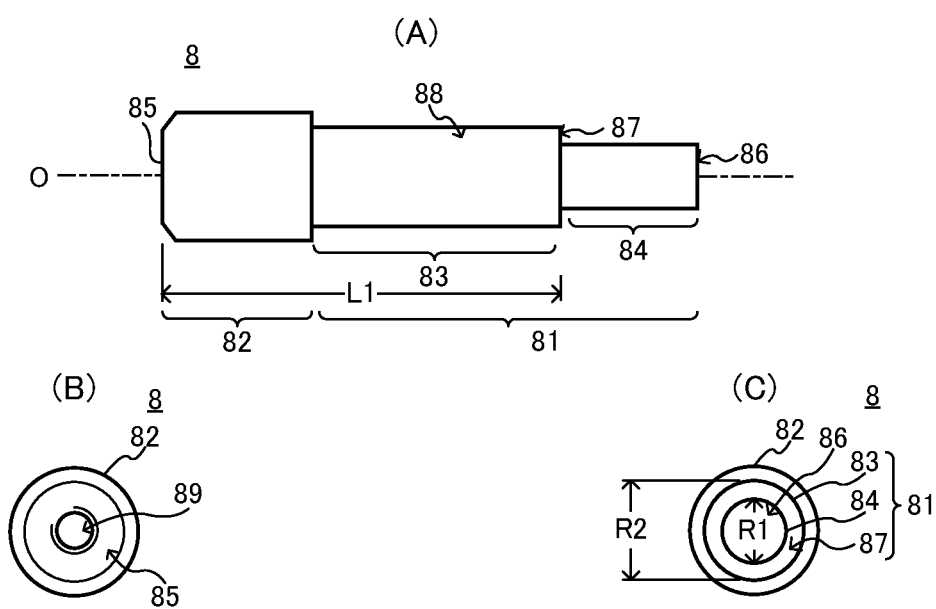
FIG. 3(A) is a front view of the push rod 8.
FIG. 3(B) and FIG. 3(C) are respectively a left side view and a right side view of the push rod 8.

FIG. 3(A) is a front view of the push rod 8, and FIG. 3(B) and FIG. 3(C) are respectively a left side view and a right side view of the push rod 8.

For this push rod 8, in order that one end face (a rear end face) 85 faces a direction of the clutch pedal arm 10, another end face (a front end face) 86 is adapted to be foremost inserted into the rod insertion opening 90 of the housing 2. As illustrated in the figures, the push rod 8 includes a pedal arm connecting section 82 to be coupled with the clutch pedal arm 10 and a stepped shaft section 81 to activate the damping mechanism in the damper 100, which are integrally formed in this order from the rear end face 85 side.

The pedal arm connecting section 82 protrudes from the rod insertion opening 90 of the housing 2 to the outside of the housing 2 (the outside of the damping mechanism holding space 20) toward the clutch pedal arm 10. This pedal arm connecting section 82, for example, has a cylindrical shape, the end face (the rear end face of the push rod 8) 85 of which is provided with a threaded hole 89 for fixing a clevis joint 16 holding the clutch pedal arm 10 rotatable. As illustrated in FIG. 1, for example, a bolt 13 fixated to the clevis joint 16 with a nut 14 is screwed into this threaded hole 89 and furthermore this bolt 13 and a nut 15 are fasten each other, thereby jointing the clutch pedal arm 10 rotatably to the push rod 8. This allows the clutch pedal arm 10 to swing about the rotation axis 12 in both direction to reciprocate the push rod 8 along its axis O in conjunction with the clutch pedal arm 10.

The shaft section 81, meanwhile, has a stepped cylindrical shape including a large diameter section 83 placed the pedal arm connecting section 82 side and a small diameter section 84 protruding from this large diameter section 83 toward the bottom part 32 of the casing 3, an outer peripheral surface 88 of which, at the boundary between the small diameter section 84 and the large diameter section 83, is provided with an annular stepped surface 87 to be directed to the damping mechanism holding space 20. In order to work the damper 100 throughout a full range of motion of the clutch pedal, the stepped surface 87 is formed at a position whose distance L1 away from the rear end face 85 of the push rod 8 is more than a maximum stroke of the push rod 8 determined according on a pedal reserve of the clutch pedal.

The small diameter section 84 has an outer diameter R1 that is permissible for insertion into a rod insertion hole 74 of the friction disk 7, and the large diameter section 83 has an outer diameter R2 more than an inner diameter R5 of the rod insertion hole 74 of the friction disk 7 so as not to allow the stepped surface 87 to pass through the rod insertion hole 74 of the friction disk 7. Consequently, by inserting the push rod 8 with the front end face 86 foremost into the rod insertion opening 90 of the housing 2 while aligning the axis O of the push rod 8 with the axis O of the damping mechanism holding space 20, the small diameter section 84 becomes inserted into the rod insertion hole 74 of the friction disk 7 and furthermore the stepped surface 87 comes in contact with a back surface 71 of this friction disk 7. Depressing the clutch pedal starts a movement of the push rod 8 toward the inside of the damping mechanism holding space 20 (in a direction α indicated in FIG. 8(A)) to give a force in a direction toward the bottom part 32 of the casing 3 to the back surface 71 of the friction disk 7 through the stepped surface 87, and therefore the two friction disks 5, 7 and the rotatable friction disk 6 placed between them move as one unit toward the bottom part 32 of the casing 3 along the axis O of the damping mechanism holding space 20 while compressing the coil spring 40. In the meantime, the rotatable friction disk 6 rotates about the axis O of the damping mechanism holding space 20 while receiving a normal load according to the elastic force of the coil spring 40 from the friction disk 5, 7 located on each side of the rotatable friction disk 6, and therefore a frictional resistance resisting the rotation of the rotatable friction disk 6 occurs between each sliding surface 60, 61 of the rotatable friction disk 6 and the corresponding sliding surface 51, 70 of the friction disks 5, 7 located on both sides of the rotatable friction disk 6.

(2) The Housing 2

As described above, the housing 2 includes the casing 3 and the cover 9, and assembling them results in the damping mechanism holding space 20.

Figure 7:
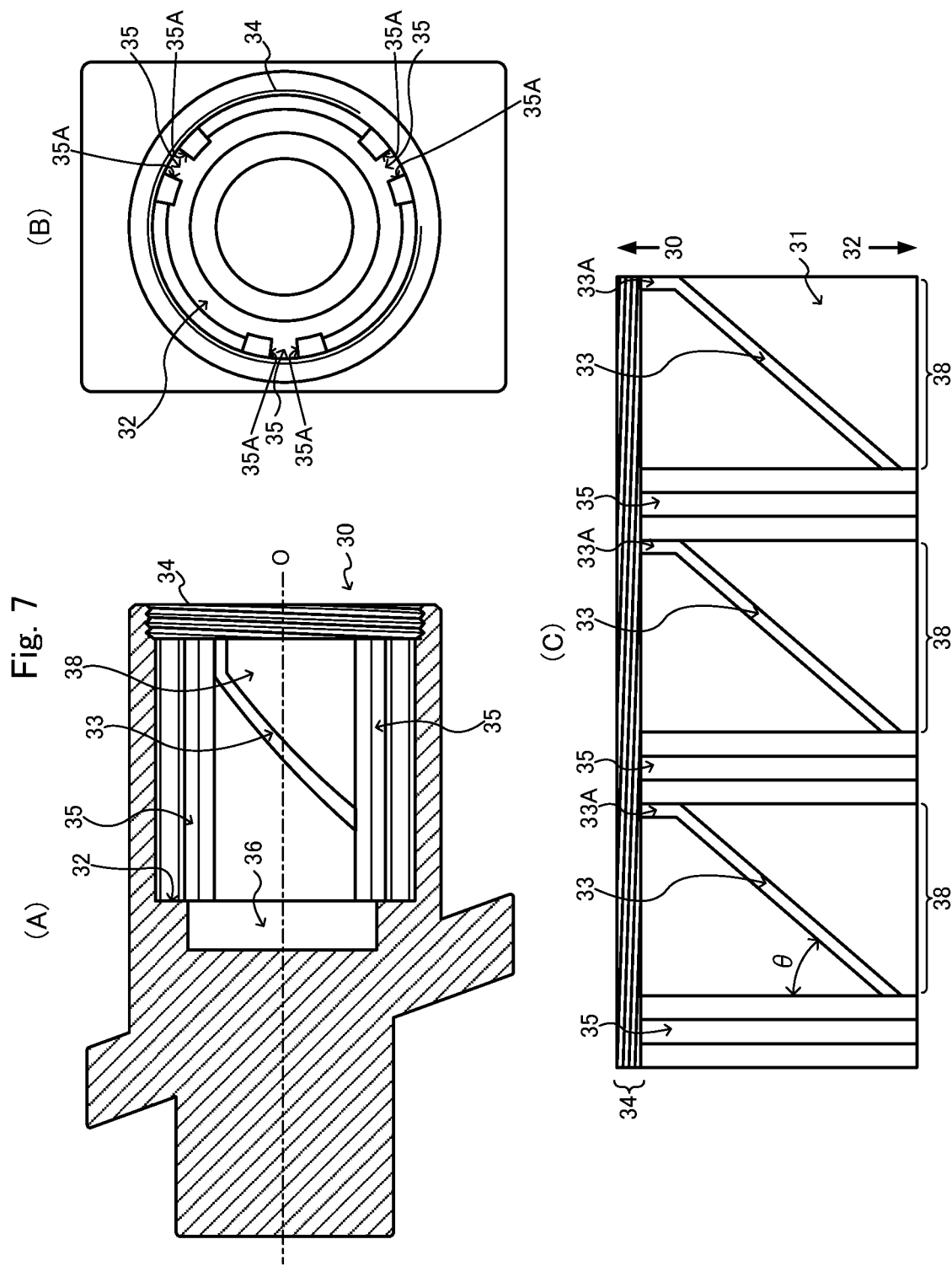
FIG. 7(A) and FIG. 7(B) are respectively, an axial sectional view and a right side view of a casing 3.
FIG. 7(C) is a net of an inner wall 31 of the casing 3.

FIG. 7(A) and FIG. 7(B) are respectively an axial sectional view and a right side view of the casing 3, and FIG. 7(C) is a net of the inner wall 31 of the casing 3.

As illustrated in the figures, the casing 3 has a bottomed hollow cylindrical shape larger than the maximum stroke of the push rod 8 in length, an inner periphery of the opening 30 of which is provided with a threaded portion 34. The cover 9, meanwhile, has a disk shape, an outer periphery of which is provided with a threaded portion 92 to be tightened into the threaded portion 34 formed on the inner periphery of the opening 30 of the casing 3 (See FIG. 2). The cover 9 is attached to the opening 30 of the casing 3, the threaded portion 92 of the cover 9 and the threaded portion 34 of the opening 30 of the casing 3 are tightened each other, and this forms the damping mechanism holding space 20 inside the housing 2. Inside of the damping mechanism holding space 20 formed in that manner, an area is secured longer than the maximum stroke of the push rod 8 in the direction of the axis O of the damping mechanism holding space 20, as the range of motion of the friction generating section 1.

Within central area of the cover 9, a through hole (the rod insertion opening of the housing 2) 90 having an inner diameter more than the outer diameter (the outer diameter of the large diameter section 83) R2 of the shaft section 81 of the push rod 8 is formed at a position which the axis O of the damping mechanism holding space 20 passes through. The rod insertion hole 74 of below-mentioned friction disk 7 is also placed at a position which the axis O of the damping mechanism holding space 20 passes through, and therefore the small diameter section 84 in the shaft section 81 of this push rod 8 becomes inserted into the rod insertion hole 74 of the friction disk 7, just by inserting this push rod 8, in the direction of its axis O and with the front end face 86 foremost, into the rod insertion opening 90 of the housing 2 while aligning the axis O of the push rod 8 with the axis O of the damping mechanism holding space 20.

On the inner wall 31 of the casing 3, a plurality of guide grooves 35 (for example, three grooves) along the axis O of the damping mechanism holding space 20 are formed at equal angular intervals about the axis O of the damping mechanism holding space 20. As described below, these guide grooves 35 each contain corresponding guide protrusions 53, 73 described later provided on outer peripheries 52, 72 of the two friction disks 5, 7 placed in the damping mechanism holding space 20, and guide in the direction of the axis O of the damping mechanism holding space 20 the corresponding guide protrusions 53, 73 in motion along the axis O of the damping mechanism holding space 20. Consequently, the two friction disks 5, 7 are to reciprocate along the axis O of the damping mechanism holding space 20 in a state of being restricted from rotational motion about the axis O of the damping mechanism holding space 20 (namely, in a state of being restricted from dragged rotation caused by the rotation of the rotatable friction disk 6 placed between these disks 5, 7).

Moreover, within each cylindrical surface region 38 between the corresponding guide grooves 35 in the inner wall 31 of the casing 3, one cam groove 33 is formed along a helix going around the axis O of the damping mechanism holding space 20. As described below, these cam grooves 33 each contain the corresponding guide protrusion 63 provided on the outer periphery 62 of the rotatable friction disk 6 placed in the damping mechanism holding space 20, and guide along a helical path the corresponding guide protrusion 63 of the rotatable friction disk 6 in reciprocating motion along the axis O of the damping mechanism holding space 20. Consequently, the rotatable friction disk 6 is to reciprocate along the axis O of the damping mechanism holding space 20 while rotating about the axis O of the damping mechanism holding space 20, once being subjected to external force in the direction of the axis O of the damping mechanism holding space 20. This results in slide between each of the sliding surfaces 60, 61 of the rotatable friction disk 6 and the corresponding sliding surface 51, 70 of the two friction disks 5, 7. In the present embodiment, provided is an inlet 33A leading from an edge around the opening 30 of the casing to one end of each cam groove 33 so that the guide protrusions 63 on the outer periphery 62 of the rotatable friction disk 6 can be inserted into the respective cam grooves 33 upon insertion of the rotatable friction disk 6 through the opening 30 of the casing 3.

A spring guide hole 36 is formed on the bottom part 32 of the casing 3 so as to surrounding the axis O of the damping mechanism holding space 20. Another end part 42 of the coil spring 40 is inserted and fixed in this spring guide hole 36 upon an insertion of the coil spring 40 into the casing 3.

For example, the outer periphery of the casing 3 may be provided with, but not limited to, a flange for fixing the damper 100 on a bracket and the like of the clutch pedal unit, as necessary.

(3) The Damping Mechanism

As described above, the damping mechanism has the friction generating section 1 including the three friction disks 5 to 7 and the coil spring 40, and the operations of them give the push rod 8 the damping force with hysteresis property.

Figure 4:
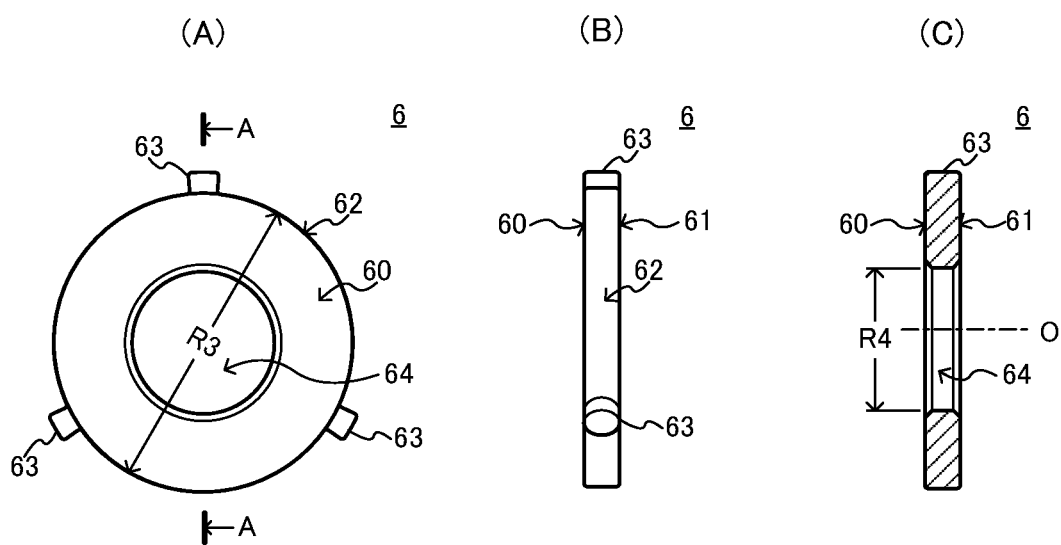
FIG. 4(A) and FIG. 4(B) are respectively a front view and a side view of a rotatable friction disk 6.
FIG. 4(C) is an A-A cross-sectional view of FIG. 4(A).

FIG. 4(A) and FIG. 4(B) are respectively a front view and a side view of the rotatable friction disk 6, and FIG. 4(C) is an A-A cross-sectional view of FIG. 4(A).

The rotatable friction disk 6 has a disk shape with an outer diameter R3 smaller than an inner diameter of the damping mechanism holding space 20, the outer periphery 62 of which is provided with the cylindrical guide protrusions 63 each corresponding to one of the cam grooves 33 of the inner wall 31 of the casing 3, at equal angular intervals about the axis O. Within central area of this rotatable friction disk 6, a through hole (a boss insertion hole) 64 is formed at a position which the axis O of the damping mechanism holding space 20 passes through, and a boss part 75 of the friction disk 7 restricted from rotational motion relative to the housing 2 is to be rotatably inserted into this boss insertion hole 64.

This rotatable friction disk 6 is placed in the damping mechanism holding space 20 in state of directing one surface 61 to the sliding surface 70 of one friction disk 7 situated nearer the cover 9 with relation to the rotatable friction disk 6 and another surface 60 to the sliding surface 51 of another friction disk 5 situated nearer the bottom part 32 of the casing 3 with relation to the rotatable friction disk 6, and the guide protrusions 63 on the outer periphery 62 thereof are placed within the respective cam grooves 33 on the inner wall 31 of the casing 3. Once the rotatable friction disk 6 receives the external force in the direction of the axis O of the damping mechanism holding space 20 to move in a direction of this external force (in a direction toward the bottom part 32 of the casing 3 or the cover 9), each of the guide protrusions 63 on the outer periphery 62 of the rotatable friction disk 6 is guided along the helical path by the corresponding cam groove 33. This causes the rotatable friction disk 6 to rotate smoothly in a rotational direction depending on a moving direction, with the boss part 75 of the friction disk 7 as a rotation axis.

This rotatable friction disk 6 works each surface 60, 61 as a sliding surface of sliding with the sliding surface 51, 70 for corresponding one out of the friction disks 5, 7 on the two sides in response to the rotation of the rotatable friction disk 6. Once one sliding surface 61 slides on one sliding surface 70 of the friction disk 7 situated on the cover 9 side with relation to the rotatable friction disk 6 with the rotation of the rotatable friction disk 6, the frictional resistance acts between these sliding surfaces 61, 70 according to a friction coefficient between the two and the elastic force of the compressed coil spring 40. Between another sliding surface 60 of the rotatable friction disk 6 and the sliding surface 51 of the friction disk 5 situated on the coil spring 40 side with relation to the rotatable friction disk 6, the frictional resistance acts according to a friction coefficient between the two and the elastic force of the compressed coil spring 40.

Figure 5:
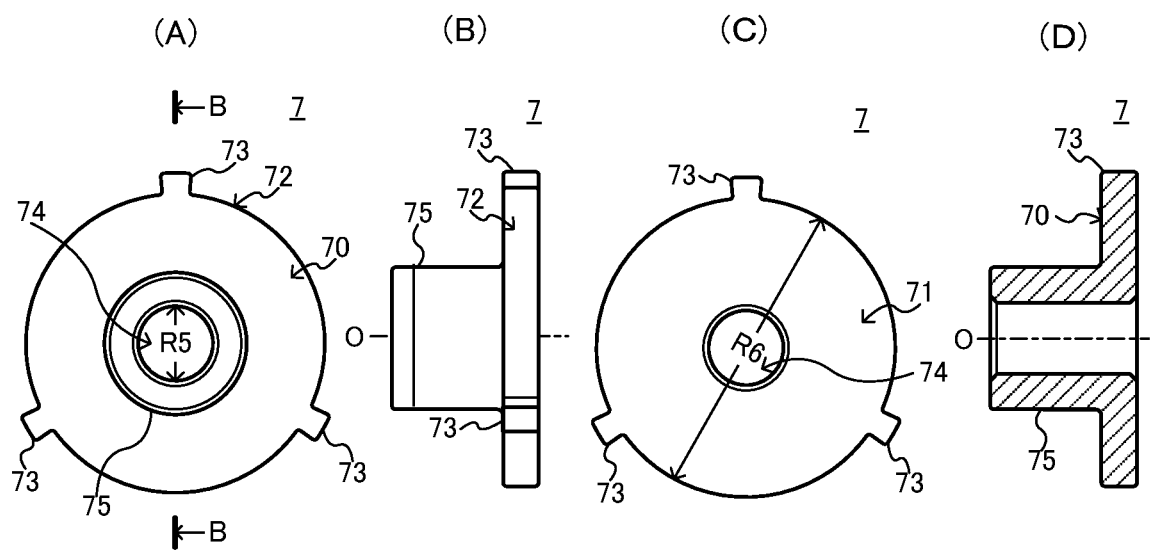
FIG. 5(A), FIG. 5(B), and FIG. 5(C) are respectively a front view, a right side view, and a back view, of a friction disk 7 to be arranged on the cover 9 side in relation to the rotatable friction disk 6.
FIG. 5(D) is a B-B cross-sectional view of FIG. 5(A).

FIG. 5(A), FIG. 5(B), and FIG. 5(C) are respectively a front view, a right side view, and a back view, of the friction disk 7 to be arranged on the cover 9 side in relation to the rotatable friction disk 6, and FIG. 5(D) is a B-B cross-sectional view of FIG. 5(A).

As illustrated in the figures, the friction disk 7 has a disk shape with an outer diameter R6 about equal to that of the rotatable friction disk 6, the outer periphery 72 of which is provided with the guide protrusions 73 each corresponding to one of the guide grooves 35 on the inner wall 31 of the casing 3 at equal angular intervals about the axis O.

In order to bring one surface 70, as a sliding surface, into facing to and surface contact with one sliding surface 61 of the rotatable friction disk 6, this friction disk 7 is placed in the damping mechanism holding space 20 in state of directing another surface 71 to the cover 9. Here, each of the guide protrusions 73 on the outer periphery 72 of the friction disk 7 is placed in the corresponding guide groove 35 on the inner wall 31 of the casing 3, and slides smoothly in this corresponding guide groove 35, along the axis O of the damping mechanism holding space 20. Consequently, once receiving an external force in the direction of the axis O of the damping mechanism holding space 20, the friction disk 7 also moves smoothly in a direction of the external force in a state of being restricted from a rotational motion around the axis O by inner wall surfaces (opposite side wall surfaces 35A: See FIG. 7) of these guide grooves 35 (namely, in state where one sliding surface 61 of the rotatable friction disk 6 slides on the sliding surface 70 of the friction disk 7 without dragged rotation caused by the rotation of the rotatable friction disk 6).

Within central area in this sliding surface 70 of the friction disk 7, formed is the cylindrical boss part 75 with diameter smaller than any of inner diameters R4, R8 of the boss insertion hole 64, 54 of the rotatable friction disk 6 and the friction disk 5. The boss part 75 becomes inserted sequentially into the boss insertion hole 64 of the rotatable friction disk 6 and the boss insertion hole 54 of the friction disk 5, and further inserted into one end part 41 of the coil spring 40. This results in stacking the three friction disks 5 to 7 on one end part 41 of the coil spring 40, in a state where the rotatable friction disk 6 rotatable about the boss part 75 is interposed between the sliding surfaces 51, 70 of the two friction disks 5, 7 each restricted from a rotational motion relative to the housing 2.

Moreover, in this boss part 75, a through hole (the rod insertion hole) 74 is formed at a position which the axis O of the damping mechanism holding space 20 passes through. This rod insertion hole 74 has the inner diameter R5 larger than the outer diameter R1 of the small diameter section 84 in the shaft section 81 of the push rod 8, into which the small diameter section 84 in the shaft section 81 of the push rod 8 is to be inserted. On the occurrence of moving (forward moving) the push rod 8 toward the bottom part 32 of the casing 3, the stepped surface 87 in the shaft section 81 of the push rod 8 pushes the two friction disks 5, 7 and the rotatable friction disk 6 interposed between them, as one unit, toward the bottom part 32 of the casing 3.

Figure 6:
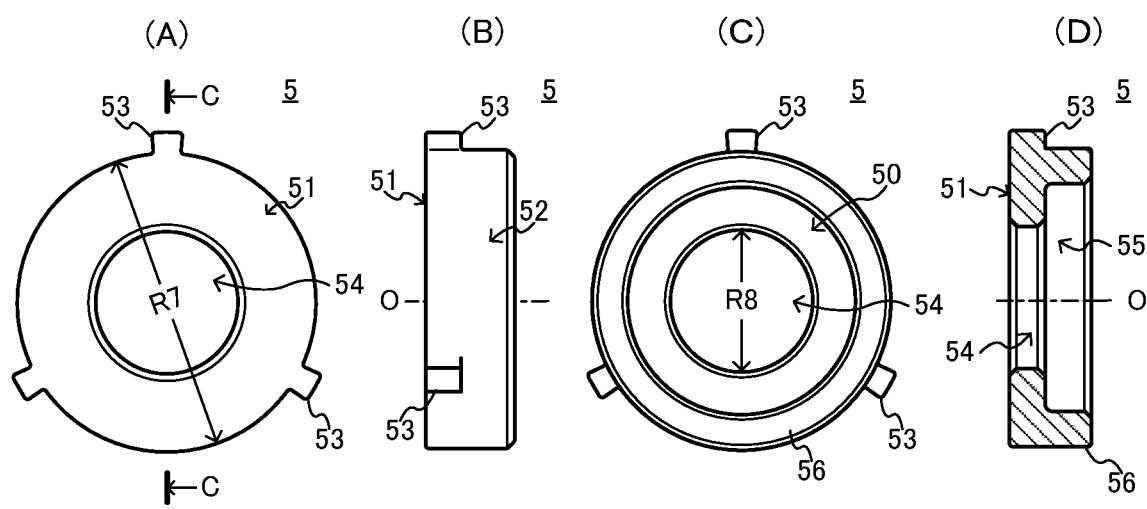
FIG. 6(A), FIG. 6(B), and FIG. 6(C) are respectively a front view, a right side view, and a back view, of a friction disk 5 to be arranged on a coil spring 40 side in relation to the rotatable friction disk 6.
FIG. 6(D) is a C-C cross-sectional view of FIG. 6(A).

FIG. 6(A), FIG. 6(B), and FIG. 6(C) are respectively a front view, a right side view, and a back view, of the friction disk 5 to be situated on the coil spring 40 side with relation to the rotatable friction disk 6, and FIG. 6(D) is a C-C cross-sectional view of FIG. 6(A).

As illustrated in the figures, the friction disk 5 has a disk shape with an outer diameter R7 about equal to the rotatable friction disk 6, the outer periphery 52 of which is provided with the guide protrusions 53 each corresponding to one of the guide grooves 35 on the inner wall 31 of the casing 3 at equal angular intervals about the axis O. A rim part 56 around one surface (a back surface) 50 of this friction disk 5 rises annularly so as to surround an outer periphery of one end part 41 of the coil spring 40 in contact with the back surface 50. This friction disk 5 is placed in the damping mechanism holding space 20 with the back surface 50 toward the bottom part 32 of the casing 3 so that another surface 51 can, as a sliding surface, face to and surface contact with another sliding surface 60 of the rotatable friction disk 6, and is attached to one end part 41 of the coil spring 40. Here, each of the guide protrusions 53 on the outer periphery 52 of the friction disk 5 is placed in the corresponding guide groove 35 on the inner wall 31 of the casing 3, and able to slide smoothly in this guide groove 35 along the axis O of the damping mechanism holding space 20. Consequently, once receiving an external force in the direction of the axis O of the damping mechanism holding space 20, this friction disk 5 moves smoothly in a direction of the external force in a state of being restricted from rotation about the axis O by these guide grooves 35 (namely, in a state where another sliding surface 60 of the rotatable friction disk 6 slides on the sliding surface 51 of the friction disk 5 without dragged rotation caused by the rotatable friction disk 6).

Within central area of this friction disk 5, a through hole (the boss insertion hole) 54 is formed at a position which the axis O of the damping mechanism holding space 20 passes through, and the boss part 75 of the friction disk 7 is to be inserted into this boss insertion hole 54 through the boss insertion hole 64 of the rotatable friction disk 6.

The coil spring 40 is placed between the friction disk 5 placed closer to the bottom part 32 of the casing 3 and the bottom part 32 of the casing 3. This coil spring 40 has a free length larger than a length of an entire length of the damping mechanism holding space 20 in the direction of the axis O (a distance from the back surface 91 of the cover 9 to the bottom part 32 of the casing 3) minus total thickness of the three friction disks 5 to 7. The coil spring 40 is thus in compression (preload) between the bottom part 32 of the casing 3 and the friction disk 5 under an initial condition of the damper 100 (in a state free from depression of the clutch pedal: the state illustrated in FIG. 8(A)), and becomes further compressed between the friction disk 5 and the bottom part 32 of the casing 3 once a depression of the clutch pedal pushes the push rod 8 and moves the two friction disks 5, 7 and the rotatable friction disk 6 interposed between the two, as one unit, toward the bottom part 32 of the casing 3. The three friction disks 5 to 7 are pushed by the elastic force of the coil spring 40 according to an amount of displacement toward the bottom part 32 of the casing 3, and therefore both sliding surfaces 60, 61 of the rotatable friction disk 6 each are subject to a normal load according to the elastic force of the coil spring 40 from the sliding surfaces 51, 70 of the two friction disks 5, 7.

Such damper 100, for example, can be attached to the push rod 8 and be incorporated as part into the clutch pedal unit, according to the following procedure.

Firstly, the coil spring 40 is inserted, with the end part 42 foremost, into the opening 30 of the casing 3 and placed in the casing 3 so that the end part 42 of the coil spring 40 has a fit within the spring guide hole 36 on the bottom part 32 of the casing 3.

Secondly, the three friction disks 5 to 7 become sequentially housed in the casing 3, in the following way.

The guide protrusions 53 of the friction disk 5 each are aligned with the corresponding guide groove 35 on the inner wall 31 of the casing 3, and at the same time, this friction disk 5 is inserted into the opening 30 of the casing 3 with the back surface 50 of the friction disk 5 directed toward the bottom part 32 of the casing 3. The friction disk 5, upon insertion into the opening 30 of the casing 3 with each of the guide protrusions 53 placed in the corresponding guide groove 35 on the inner wall 31 of the casing 3, moves smoothly toward the bottom part 32 of the casing 3 just by receiving a force (e.g. its own weight) toward the bottom part 32 of the casing 3. This results in placement inside the casing 3, of the friction disk 5 in an attached state on the end part 41 of the coil spring 40.

The guide protrusions 63 on the outer periphery 62 of the rotatable friction disk 6 each are aligned with the corresponding inlet 33A to one of the cam grooves 33 of the inner wall 31 of the casing 3, and at the same time, this rotatable friction disk 6 is inserted into the opening 30 of the casing 3. This introduces the guide protrusions 63 on the outer periphery 62 of the rotatable friction disk 6 into the respective cam grooves 33 of the inner wall 31 of the casing 3 through the respective inlets 33A, and therefore the rotatable friction disk 6 moves smoothly toward the bottom part 32 of the casing 3 while rotating smoothly about the axis O of the casing 3, just by receiving a force (e.g. its own weight) toward the bottom part 32 of the casing 3. The rotatable friction disk 6 is thereby placed inside the casing 3 with another sliding surface 60 in contact with the sliding surface 51 of the friction disk 5.

Moreover, the guide protrusions 73 of the friction disk 7 each are aligned the corresponding guide groove 35 on the inner wall 31 of the casing 3, and at the same time, this friction disk 7 is inserted into the opening 30 of the casing 3 with its sliding surface 70 facing the sliding surface 61 of the rotatable friction disk 6. The friction disk 7, upon being inserted into the opening 30 of the casing 3 with each of the guide protrusions 73 of the outer periphery 72 placed in the corresponding guide groove 35 on the inner wall 31 of the casing 3, moves smoothly toward the rotatable friction disk 6 just by receiving a force (e.g. its own weight) toward the bottom part 32 of the casing 3. As a result, the boss part 75 of the friction disk 7 becomes inserted sequentially into the boss insertion hole 64 of the rotatable friction disk 6 and the boss insertion hole 54 of the other friction disk 5, and the friction disk 7 is placed inside the casing 3 with its sliding surface 70 in contact with one sliding surface 61 of the rotatable friction disk 6.

The cover 9 is attached to the opening 30 of the casing 3 and the threaded portion 34 of the opening 30 of the casing 3 and the threaded portion 92 of the cover 9 are tighten each other, thereby forming the damping mechanism holding space 20 in the housing 2. The free length of the coil spring 40 is larger than the measurement of the entire length of the damping mechanism holding space 20 in the direction of the axis O minus total thickness of the three friction disks 5 to 7, and therefore the coil spring 40 housed in the damping mechanism holding space 20 is in slight compression (preload) between the bottom part 32 of the casing 3 and the back surface 50 of the friction disk 5 because of tighten between the threaded portion 92 of the cover 9 and the threaded portion 34 of the opening 30 of the casing 3.

Then, the axis O of the push rod 8 is aligned with the axis O of the damping mechanism holding space 20, and at the same time, this push rod 8 is inserted, with the shaft section 81 foremost, into the rod insertion opening 90 of the housing 2. Consequently, the small diameter section 84 in the shaft section 81 of the push rod 8 is inserted into the rod insertion hole 74 of the friction disk 7, inside the damping mechanism holding space 20.

The damper 100 is attached to the push rod 8 in this manner, and then the damper 100 is placed, as an alternative to a master cylinder, in a master cylinder mount space of the clutch pedal unit and fixed to the bracket 17.

Next, behaviors of the damper 100 incorporated in an electric clutch actuator will be described.

Figure 8:
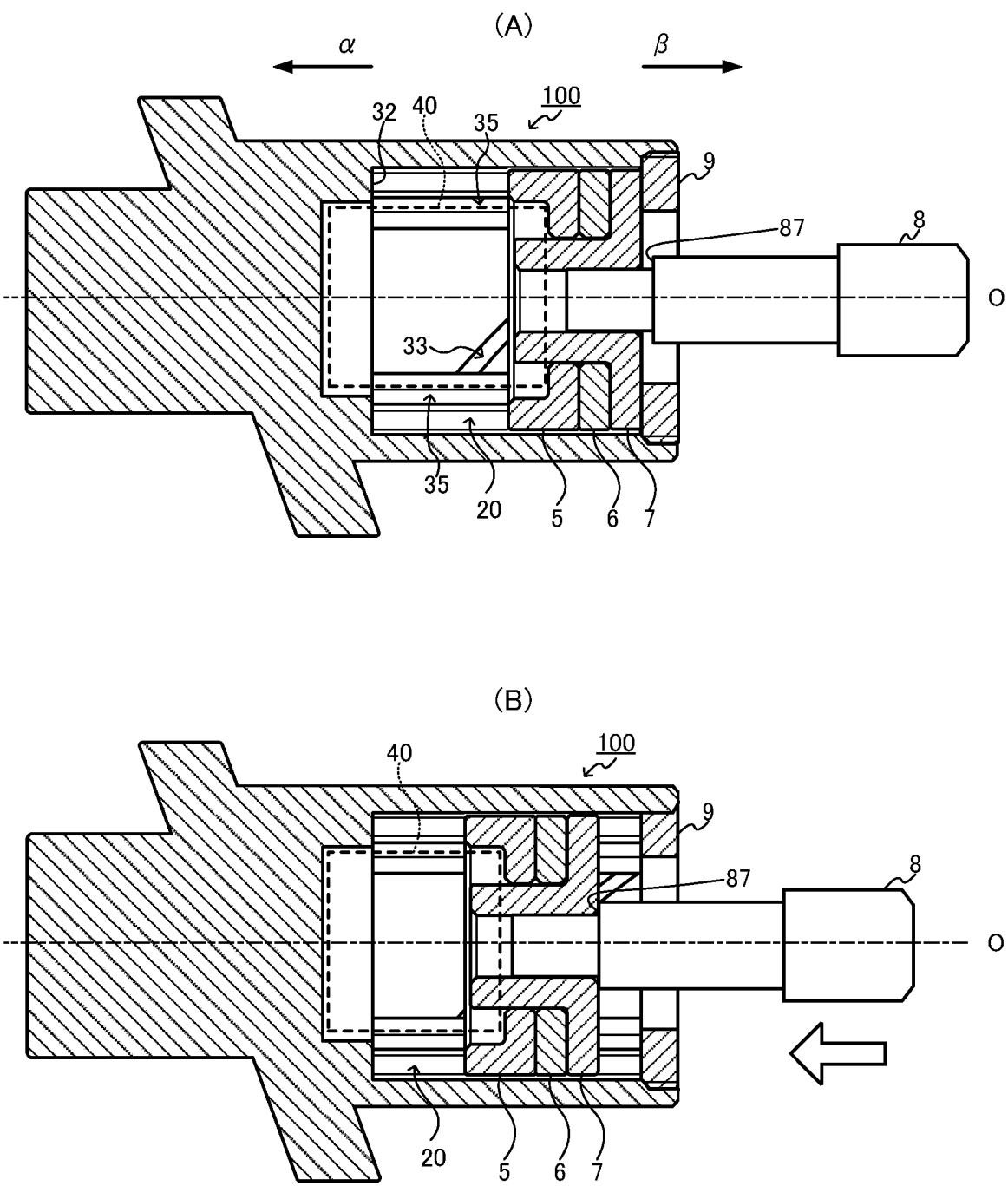
FIG. 8(A) is a schematic diagram for explanation about positions of the three friction disks 5 to 7 within a damping mechanism holding space 20 in a state free from depression of the clutch pedal (under an initial condition)
FIG. 8(B) is a schematic diagram for explanation about the positions of the three friction disks 5 to 7 within the damping mechanism holding space 20 upon depression of the clutch pedal.

FIG. 8 includes schematic diagrams for explanation about changes in state inside of the damping mechanism holding space 20 before and after depression of the clutch pedal: FIG. 8(A) illustrates positions of the three friction disks 5 to 7 within the damping mechanism holding space 20 in a state free from depression of the clutch pedal (the initial condition), and FIG. 8(B) illustrates the positions of the three friction disks 5 to 7 within the damping mechanism holding space 20 upon depression of the clutch pedal. However, FIGS. 8(A) and 8 (B) each illustrate an outline of the coil spring 40 with dotted line, and thereby simplified illustrating the inside of the damping mechanism holding space 20.

As illustrated in FIG. 8(A), under the initial condition of the damper 100, the stepped surface 87 of the push rod 8 is located outside the damping mechanism holding space 20, and the two friction disks 5, 7 and the rotatable friction disk 6 interposed between these disks 5, 7 are pushed against the back surface 91 of the cover 9 as one unit to be positioned at respective default positions in the damping mechanism holding space 20. Here, the default position for the friction disk 5 to 7 in the damping mechanism holding space 20 each correspond to one limit position of movement of the corresponding friction disk 5 to 7 in the damping mechanism holding space 20, and the friction disks 5 to 7 at this positions are in a situation where the sliding surfaces 51, 70 of the two friction disks 5, 7 are in close contact with both sliding surfaces 60, 61 of the rotatable friction disk 6 and where the back surface 71 of the friction disk 7 situated on the coil side with relation to the rotatable friction disk 6 is abutting the back surface 91 of the cover 9.

When any driver depresses the clutch pedal to rotate the clutch pedal arm 10 in an intended direction about the rotation axis 12, the push rod 8 starts moving in a direction α toward the bottom part 32 of the casing 3 in conjunction with the clutch pedal arm 10. Hereinafter a motion in the direction α toward the bottom part 32 of the casing 3 (the forward stroke) is referred to as "forward motion", and a motion in a direction β away from the bottom part 32 of the casing 3 (a direction opposite to the direction α: the backward stroke) is referred to as "backward motion".

When the forward motion of the push rod 8 causes the stepped surface 87 of the push rod 8 to enter the damping mechanism holding space 20 through the rod insertion opening 90 of the housing 2 to abut the back surface 71 of the friction disk 7, the elastic force of the coil spring 40 pushes the two friction disks 5, 7 and the rotatable friction disk 6 interposed therebetween, as one unit, against the stepped surface 87 of the push rod 8, and therefore both sliding surfaces 60, 61 of the rotatable friction disk 6 each receive a normal load according to the elastic force of the coil spring 40 from the two friction disks 5, 7.

Then, the push rod 8 does the forward motion while pushing with the stepped surface 87, toward the bottom part 32 of the casing 3, the two friction disks 5, 7 and the rotatable friction disk 6 that are biased toward the cover 9 by the coil spring 40.

In the meantime, the cam grooves 33 of the inner wall 31 of the casing 3 guides the respective guide protrusions 63 on the outer periphery 62 of the rotatable friction disk 6 along the helical path, and therefore the rotatable friction disk 6 does a forward motion toward the bottom part 32 of the casing 3 while rotating about the axis O of the damping mechanism holding space 20; whereas the two friction disks 5, 7 each are restricted from rotational motion by engagement between each of the guide protrusions 53, 73 on the respective outer peripheries 52, 72 and the corresponding guide groove 35 on the inner wall 31 of the casing 3, therefore doing the forward motion to the bottom part 32 of the casing 3 without dragged rotation caused by the rotation of the rotatable friction disk 6. In other word, the two friction disks 5, 7 and the rotatable friction disk 6 interposed between the two do the forward motion in the damping mechanism holding space 20 while sliding both sliding surfaces 60, 61 of the rotatable friction disk 6 on the respective sliding surfaces 51, 70 of the two friction disks 5, 7. This causes the frictional resistance in a direction of suppressing the rotation of the rotatable friction disk 6, between each of both sliding surfaces 60, 61 of the rotatable friction disk 6 and the corresponding sliding surfaces 51, 70 of the two friction disks 5, 7, consequently allowing the damping force caused by this frictional resistance to suppress the forward motion of the rotatable friction disk 6, namely the forward motion of the push rod 8 pushing the rotatable friction disk 6 and the friction disks 5, 7 toward the bottom part 32 of the casing 3.

In the meantime, a distance between the friction disk 5 situated nearer the bottom part 32 of the casing 3 with relation to the rotatable friction disk 6 and the bottom part 32 of the casing 3 becomes gradually decreased as illustrated in FIG. 8(B), and therefore the coil spring 40 gets further compressed between the back surface 50 of this friction disk 5 and the bottom part 32 of the casing 3. Consequently, the elastic force of the coil spring 40 pushes the two friction disks 5, 7 and the rotatable friction disk 6 interposed between them more strongly against the stepped surface 87 of the push rod 8 as the push rod 8 moves forward. This increases the normal load on each sliding surface 60, 61 of the rotatable friction disk 6 from the corresponding sliding surface 51, 70 of the two friction disks 5, 7 gradually; therefore the frictional resistance between each sliding surface 60, 61 of the rotatable friction disk 6 and the corresponding sliding surface 51, 70 of the two friction disks 5, 7 increases gradually as push rod 8 moves forward, and the damping force of suppressing the forward motion of the push rod 8 also increases concomitantly.

As described above, since the push rod 8 in the forward motion is damped by the damping force causing by the frictional resistance that increases with the forward motion of the push rod 8, driver's foot (driving source) depressing on the clutch pedal is given a suitable load according to an amount of depression of the clutch pedal.

Here, just as the driver pauses further depression of the clutch pedal, the forward motion of the push rod 8 pauses, and this time, the frictional resistance in a direction of suppressing the coil spring 40 from returning (in a direction of suppressing the backward motion of the push rod 8) acts between each sliding surface 51, 70 of the two friction disks 5, 7 and the corresponding surfaces 60, 61 of the rotatable friction disk 6. This results in rapidly decreasing the load on the driver's foot holding the clutch pedal in place.

Just as the driver relaxes the depression of the clutch pedal to allow the clutch pedal arm 10 to rotate in the opposite direction, the push rod 8 starts the backward motion. The stepped surface 87 of the push rod 8 moves backward to the rod insertion opening 90 of the housing 2 in response to the backward motion of the push rod 8, and therefore the two friction disks 5, 7 and the rotatable friction disk 6 between them are biased as one unit by the coil spring 40 to similarly do backward motion in the damping mechanism holding space 20 along with the push rod 8.

In the meantime, the guide protrusions 63 on the outer periphery 62 of the rotatable friction disk 6 are guided in a direction opposite to that during the forward motion by the respective cam grooves 33 on the inner wall 31 of the casing 3, and therefore the rotatable friction disk 6 does a backward motion toward the cover 9 while rotating in a direction opposite to that during the forward motion; whereas the two friction disks 5, 7 each are restricted from rotational motion by engagement between each of the guide protrusions 53, 73 on the respective outer peripheries 52, 72 and the corresponding guide groove 35 on the inner wall 31 of the casing 3, therefore doing the backward motion to the cover 9 without dragged rotation caused by the rotation of the rotatable friction disk 6. In other word, the two friction disks 5, 7 and the rotatable friction disk 6 between the two do the backward motion in the damping mechanism holding space 20 while sliding the sliding surfaces 60, 61 of the rotatable friction disk 6 on the respective sliding surfaces 51, 70 of the two friction disks 5, 7. This causes the frictional resistance in the direction of suppressing the rotation of the rotatable friction disk 6, between each sliding surface 60, 61 of the rotatable friction disk 6 and the corresponding sliding surface 51, 70 of the two friction disks 5, 7, and the backward motion of the rotatable friction disk 6 (namely, the backward motion of the push rod 8) is gradually done under the damping force caused by this frictional resistance.

Here, since a distance between the friction disk 5 nearer the bottom part 32 of the casing 3 in relation to the rotatable friction disk 6 and the bottom part 32 of the casing 3 increases gradually, the coil spring 40 returns a preloaded state under the initial condition of the damper 100 gradually. This further decreases the normal load on each sliding surface 60, 61 of the rotatable friction disk 6 from the corresponding one of the two friction disks 5, 7 gradually as the push rod 8 moves backward motion, and further decreases the frictional resistance between each sliding surface 60, 61 of the rotatable friction disk 6 and the corresponding sliding surface 51, 70 of the two friction disks 5, 7 gradually. The damping force of suppressing the backward motion of the push rod 8 also decreases concomitantly.

In this manner, the push rod 8 does the backward motion while receiving the damping force caused by the frictional resistance to decrease with the backward motion of the push rod 8, and the clutch pedal returns to the default position smoothly in response to a motion of the driver's foot (driving source) that depresses the clutch pedal.

As described above, according to the damper 100 of the present embodiment, the reciprocating motion of the push rod 8 is transformed to the rotational motion of the rotatable friction disk 6 due to the engagement between each guide protrusion 63 of the rotatable friction disk 6 and the corresponding cam groove 33 provided on the inner wall 31 of the damping mechanism holding space 20, and the sliding surface 51, 70 of each friction disk 5, 7 is pushed against the corresponding sliding surface 60, 61 of the rotatable friction disk 6 by the elastic force according to an amount of displacement of the push rod 8. This gives the push rod 8 the damping force with hysteresis property (a reaction force to vary in magnitude between in the forward stroke and in the backward stroke). Consequently, it becomes possible for the driving source (driver's foot) which gives the push rod 8 a force in a predetermined direction along the axis O of the push rod to be given the damping force caused by the frictional resistance between each of the sliding surfaces 51, 70 of the two friction disks 5, 7 and the corresponding sliding surface 60, 61 of the rotatable friction disk 6, namely a reaction force to vary in magnitude between in the forward stroke and in the backward stroke within one cycle stroke (a load with hysteresis property).

The present invention can include, but is not limited to, the above embodiment; it will be obvious to those skilled in the art that various changes may be made without departing from the scope of the invention.

The present embodiment has been described including an example of the damper 100 to be incorporated into the clutch pedal unit of the clutch by wire system for the vehicle, but not limited to the example; the damper according to the present invention is applicable to use for application where it is beneficial that a damping force having hysteresis property damps a reciprocating motion of a movable member linked to an operation member capable of moving in reaction to a force received from user, for example. The damper may be built into not limited to the clutch by wire system for an automobile but various apparatuses, such as musical instruments, game machines, and various devices, each having a linear motion member to be linked to an operation unit (e.g. a pedal arm, a lever, and a handle) movable in response to an operation, such as a push operation and a pull operation given by user body part, such as hand and foot.

The opening 30 of the casing 3 is closed with the screw jointing type cover 9 in a disk shape, but it may not always be necessary to be in this manner. For example, when the coil spring 40 is allowed to be preload in a manner rather than screwing the cover 9 onto the opening 30 of the casing 3, it may be unnecessary to use the screw jointing type cover 9 in a disk shape. The screw jointing type cover 9 may be replaced by a fixing member of being joined to the opening 30 of the casing 3 in a manner other than the screw jointing (for example, adhesion, snap-fit) to prevent a member from dropping from the inside of the damping mechanism holding space 20. This fixing member may be a disk-shaped cover having the rod insertion opening 90 leading to the inside of the damping mechanism holding space 20, or a member in any shape other than disk, such as bifurcated fixing member used in an example as described below.

As described hereafter, the casing 3 with the helical cam grooves 33 on the inner wall 31 may be comprised of an assemblage of a plurality of members each in easily formable shape by a forming process, such as an injection molding and a die casting. For example, the casing 3 may has a casing body member in a substantial cylindrical shape and one or more liner members to be placed in the casing body member so as to form the helical cam grooves 33 on an inner wall of the casing body member.

FIG. 9(A) and FIG. 9(B) are respectively an axial sectional view and a right side view, of a casing body member 300, and FIG. 10(A), FIG. 10(B), and FIG. 10(C) are respectively a front view, a plan view, and a bottom view, of a liner member 350 placed in the casing body member 300.

As illustrated in the figures, the casing body member 300 has a hollow cylindrical shape with the opening 30 at one end part, the inner wall is provided with the aforementioned guide grooves 35 formed at about equal angular intervals about the axis O so as to extend along the axis O of the damping mechanism holding space 20. In the inner wall of the casing body member 300, each area between successive corresponding guide grooves 35 includes cylindrical surface regions different from each other in inner diameter (a large diameter cylindrical surface region 303 and a small diameter cylindrical surface region 304), and at the boundary between the regions 303, 304 stepped surfaces (hereinafter referred to as "cam faces") 301 facing the direction of the opening 30 and stepped surfaces 306 facing the respective cam faces 301 are formed. Each of the cam faces 301 is formed along a helix going around the axis O of the damping mechanism holding space 20 and guides, mainly during the forward stroke of the push rod 8, the corresponding guide protrusion 63 on the outer periphery 62 of the rotatable friction disk 6 along the helical path, whereas each of the stepped surfaces 306 facing the corresponding cam face 301 is formed along the axis O and, mainly during the backward stroke of the push rod 8, comes into contact with a side 358 of corresponding liner part 352 as described below included by the liner member 350 to prevent the rotation of the liner member 350 about the axis O relative to the casing body member 300.

The liner member 350, meanwhile, includes a base part 351 in a substantial annular shape to be attached to the opening 30 of the casing body member 300, and liner parts 352 formed on an outer edge of the base part 351 at about equal angular intervals around the axis O so as to project from one surface (a surface to be directed inside of the casing body member 300) 354 of the base part 351 in the direction of the axis O Each of the liner parts 352 is curved in a form of substantial cylindrical surface along the large diameter cylindrical surface region 303 between the corresponding guide grooves 35 on the inner wall of the casing body member 300 so as to be attached to this large diameter cylindrical surface region 303. Each of the liner parts 352 has a thickness approximately equal to a width T of the cam face 301 on the inner wall of the casing body member 300, an end face of which includes a cam face 356 in a substantial helical form surrounding the axis O and a surface (hereinafter referred to as "side") 358 extending in the direction of the axis O located on an opposite side of this cam face 356. Mainly during the backward stroke of the push rod 8, each of the cam faces 356 guides the corresponding guide protrusion 63 on the outer periphery 62 of the rotatable friction disk 6 along the helical path, and each of the sides 358 located on the opposite side on the corresponding cam face 356 comes into contact with the corresponding stepped surface 306 on the inner wall of the casing body member 300 to prevent the rotation of the liner member 350 receiving a force about the axis O the while.

One surface 354 of the base part 351 is provided with protrusions (hereinafter referred to as "stopper parts") 353 each formed at a predetermined position between the corresponding liner parts 352 next to each other in a circumferential direction. These stopper parts 353 are inserted in the respective guide grooves 35 on the inner wall of the casing body member 300 to position the cam face 356 of the each liner part 352 at a position of a predetermined distance from the corresponding cam face 301 on the inner wall of the casing body member 300. Inserting the stopper parts 353 into the respective guide groove 35 on the inner wall of the casing body member 300 positions the side 358 of each liner part 352 at a position facing to the corresponding stepped surface 306 on the inner wall of the casing body member 300, and therefore the rotation of the liner member 350 relative to the casing body member 300 is prevented by both a contact between the side 358 of each liner part 352 and the corresponding stepped surface 306 on the inner wall of the casing body member 300 and a contact between each of the stopper parts 353 and each side wall surface 35A of the corresponding guide groove 35 in the inner wall of the casing body member 300. This results in keeping a distance between each of the cam faces 301 on the inner wall of the casing body member 300 and the opposite cam face 356 of the corresponding liner part 352 on any of the forward stroke and the backward stroke of the push rod 8.

These members 300, 350 are assembled in the following way to create the casing 3.

Each guide protrusion 53 of the friction disk 5 is aligned with the corresponding guide groove 35 in the inner wall of the casing body member 300 where the coil spring 40 is already contained, and at the same time, the friction disk 5 is inserted into the opening 30 of the casing body member 300 with the back surface 50 of the friction disk 5 facing the inside of the casing body member 300; the friction disk 5 is thereby attached onto the end part 41 of the coil spring 40 in the casing body member 300. Then, the rotatable friction disk 6 is inserted into the opening 30 of the casing body member 300 so that the guide protrusions 63 on the outer periphery 62 of the rotatable friction disk 6 are arranged on the respective cam face 301 in the inner wall of the casing body member 300; the rotatable friction disk 6 is thereby stacked on the sliding surface 51 of the friction disk 5. Moreover, each guide protrusion 73 of the friction disk 7 is aligned the corresponding guide groove 35 on the inner wall of the casing body member 300, at the same time, this friction disk 7 is inserted into the opening 30 of the casing body member 300; thereby the boss part 75 of the friction disk 7 is inserted sequentially into the boss insertion hole 64 of the rotatable friction disk 6 and the boss insertion hole 54 of another friction disk 5 and the friction disk 7 is stacked onto the sliding surface 61 of the rotatable friction disk 6.

In this situation, the liner member 350 is inserted, with a top end 357 of each liner part 352 foremost, into the casing body member 300 in the direction of the axis O so that each liner part 352 of the liner member 350 is arranged within the separate large diameter cylindrical surface region 303 between the guide grooves 35 of the casing body member 300, and each stopper part 353 of the liner member 350 is inserted into the corresponding guide groove 35 on the inner wall of the casing body member 300. As a result for each liner part 352 of the liner member 350, the cam face 356 and the corresponding cam face 301 in the inner wall of the casing body member 300 face keeping a predetermined distance away from each other and the side 358 is positioned at a position facing the stepped surface 306 on the inner wall of the casing body member 300. Consequently, the cam faces 301 on the inner wall of the casing body member 300 and the cam faces 356 of the liner parts 352 of the liner member 350 create the helical cam grooves 33 each having a predetermined width on the inner wall of the casing body member 300, and the guide protrusions 63 on the outer periphery 62 of the rotatable friction disk 6 are placed in these cam grooves 33.

Figure 9:
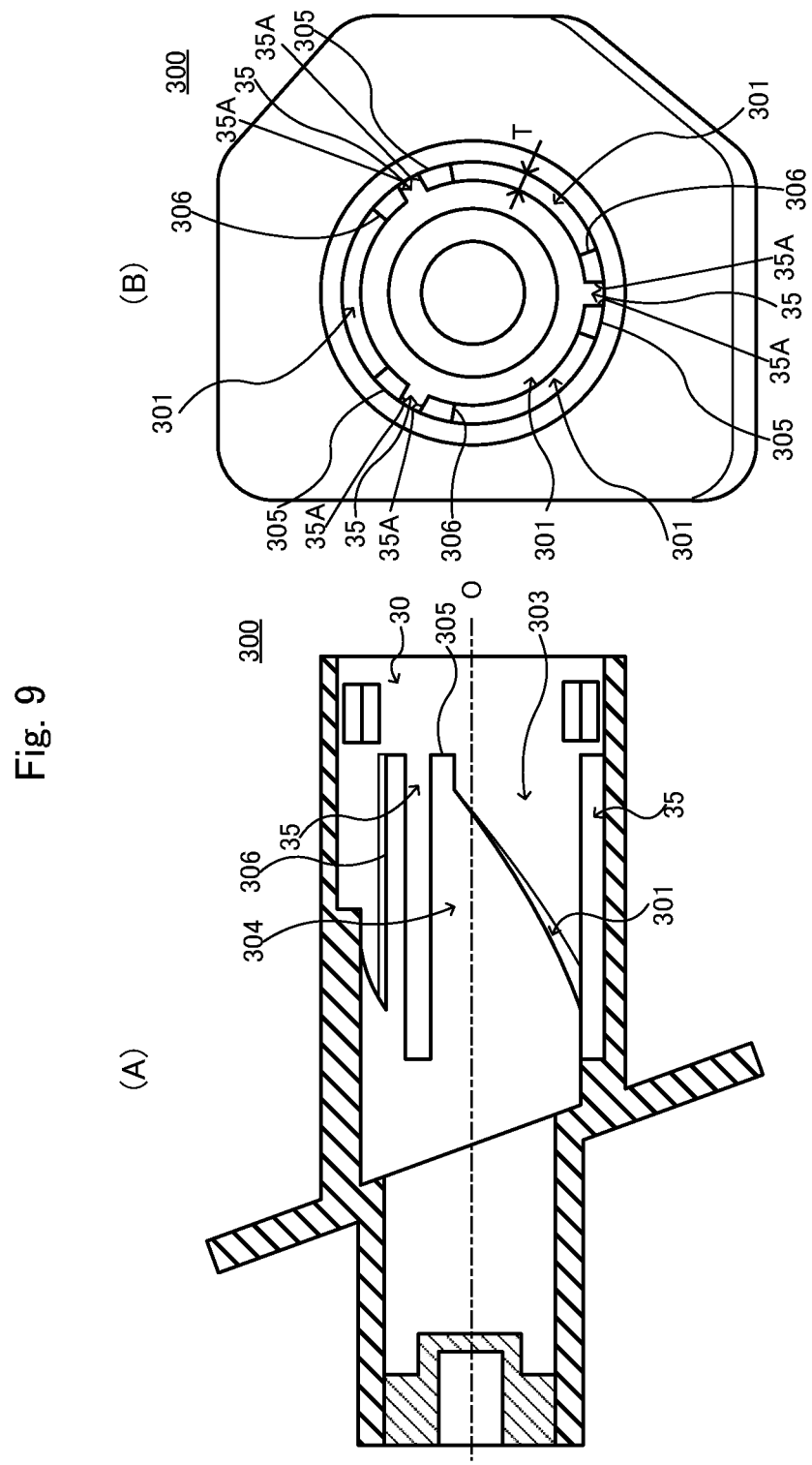
FIG. 9(A) and FIG. 9(B) are respectively an axial sectional view and a right side view of a casing body member 300.

For the example illustrated in FIG. 9, the cam faces 301 are formed directly on the inner wall of the casing body member 300: however, as an alternative to direct formation of the cam face 301 on the inner wall of the casing body member, using any member other than the casing body member may form the cam face 301 inside of the casing body member. As described below, for example, another liner member 370 with the cam faces 301 may be placed on an inside (a large diameter region 3601) of a casing body member 300A in a substantial circular tubular shape so that each cam face 301 and the cam face 356 of any liner part 352 of the aforementioned liner member 350 face and position keeping a predetermined distance from each other. As for such a structure, stocking plural types of the liner members 350, 370 having the cam faces 356, 301 different from each other in slope enables any of the casings 3A (See FIG. 16) with different slope angles to be assembled using same casing body member 300A.

Figure 16:
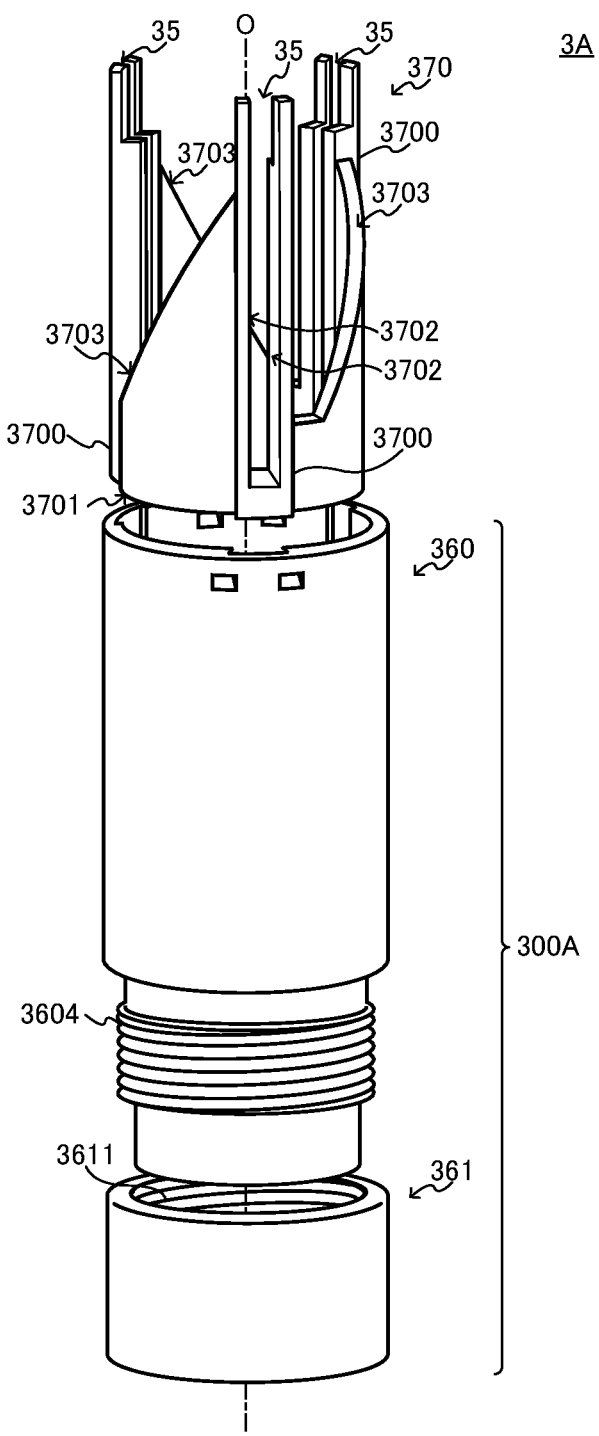
FIG. 16 is a schematic diagram for explanation about a structure of a casing, an inner wall of which is provided with cam grooves 33 formed by two types of liner members 350, 370.

FIG. 16 is a schematic diagram for explanation about a structure of the casing 3A, an inner wall of which is provided with the cam grooves 33 formed by two types of the liner members 350, 370.

A Housing has the casing 3A having an inner wall provided with the cam grooves 33 each formed by two types of the liner members 350, 370 and a bifurcated fixing member in snap-fit form (not illustrated in the figures) for preventing the liner members 350, 370 and the like from dropping through an opening 30 of the casing 3A.

As illustrated in the figures, the casing 3A has the casing body member 300A in a substantial cylindrical shape and two types of the liner members 350, 370 to be arranged along an inner wall of the casing body member 300A so as to form the helical cam grooves 33 on the inner wall of the casing body member. It is to be noted that one liner member 350 is omitted from FIG. 16 since being also arranged in the same way in the casing body member 300 illustrated in FIG. 9.

The casing body member 300A has a two-piece structure including a cylindrical member 360 and a cover 361 attached to one end part of the cylindrical member 360.

Figure 17:
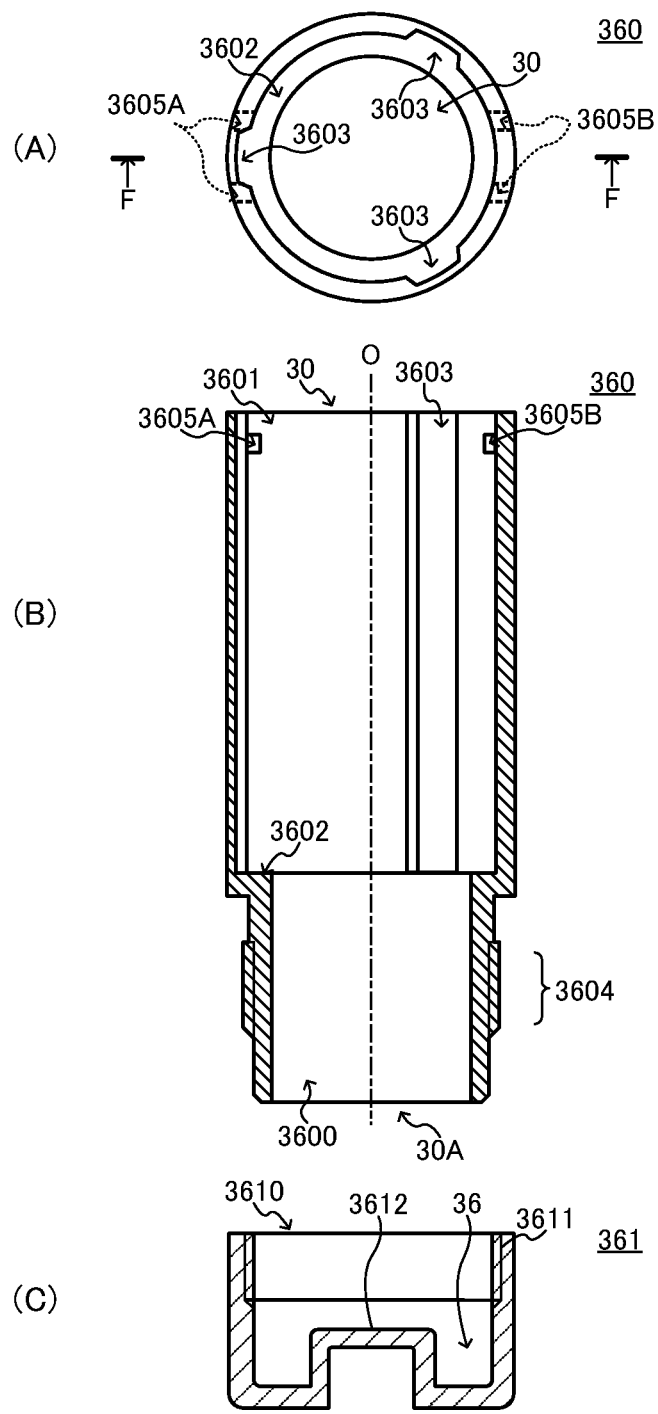
FIG. 17(A) is a front view of a cylindrical member 360.
FIG. 17(B) is an F-F cross-sectional view of FIG. 17(A)
FIG. 17(C) is an axial sectional view of a cover 361.

FIG. 17(A) is a front view of the cylindrical member 360, FIG. 17(B) is an F-F cross-sectional view of FIG. 17(A), and FIG. 17(C) is an axial sectional view of the cover 361.

As illustrated in the figures, the cylindrical member 360 has a circular tubular shape with openings 30, 30A on both sides. In space inside the cylindrical member 360, two regions (the large diameter region 3601 located on the one opening 30 side and a small diameter region 3600 located on the other opening 30A side) with inner diameters different from each other are successively formed so as to be aligned in the direction of the axis O, and therefore a stepped surface 3602 directed toward one opening 30 is circumferentially formed at boundary between the large diameter region 3601 and the small diameter region 3600. This stepped surface 3602 is to abut a bottom surface 3701 of the liner member 370 inserted in the large diameter region 3601 within the cylindrical member 360 through one opening 30 to prevent drop of the liner member 370 from another opening 30A.

On the inner wall of the cylindrical member 360, a plurality of liner member fixing grooves 3603, at about equal angular intervals, are formed from one opening 30 to the stepped surface 3602 along the axis O. These liner member fixing grooves 3603 each hold one of below-mentioned stopper parts 3700 projecting from an outer periphery of the liner member 370, therefore preventing the rotation of the liner member 370 about the axis O relative the cylindrical member 360.

Two pairs 3605A, 3605B of fixing member insertion holes are formed on end part on the opening 30 side of the cylindrical member 360 so as to be arranged at positions symmetrical about a diameter of the cylindrical member 360.

Into the fixing member insertion holes in each pair 3605A, 3605B are inserted the respective branches of the bifurcated fixing member in snap-fit form, thereby preventing the liner member 350 and the like placed in the large diameter region 3601 within the cylindrical member 360 from dropping through one opening 30.

A threaded section 3604 is formed on an outer periphery of the small diameter region 3600 of the cylindrical member 360. Although not illustrated in FIG. 16 and the like, an outer periphery of the cylindrical member 360 may be at need provided with portions, such as a flange for fixing the damper 100 on the bracket and the like of the clutch pedal unit, for example.

The cover 361, meanwhile, has a cylindrical shape with a bottom, an inner periphery of an opening 3610 of which is provided with a threaded section 3611 for tightening onto the threaded section 3604 on the outer periphery of the cylindrical member 360. A bottom part 3612 of the cover 361 is provided with the spring guide hole 36 in a substantial annular shape surrounding the axis O. The end part 41 of the coil spring 40 becomes inserted through the opening 30A of the cylindrical member 360 in a state where the end part 42 of the coil spring 40 has a fit within this spring guide hole 36, the cover 361 becomes attached to the opening 30A of the cylindrical member 360, and then the threaded section 3604 on the outer periphery of the cylindrical member 360 and the threaded section 3611 on the inner periphery of the cover 361 get tightened each other: the coil spring 40, under a preloaded condition between the bottom part of the cover 361 and the back surface 50 of the friction disk 5, is thereby housed in the damping mechanism holding space 20.

Figure 18:
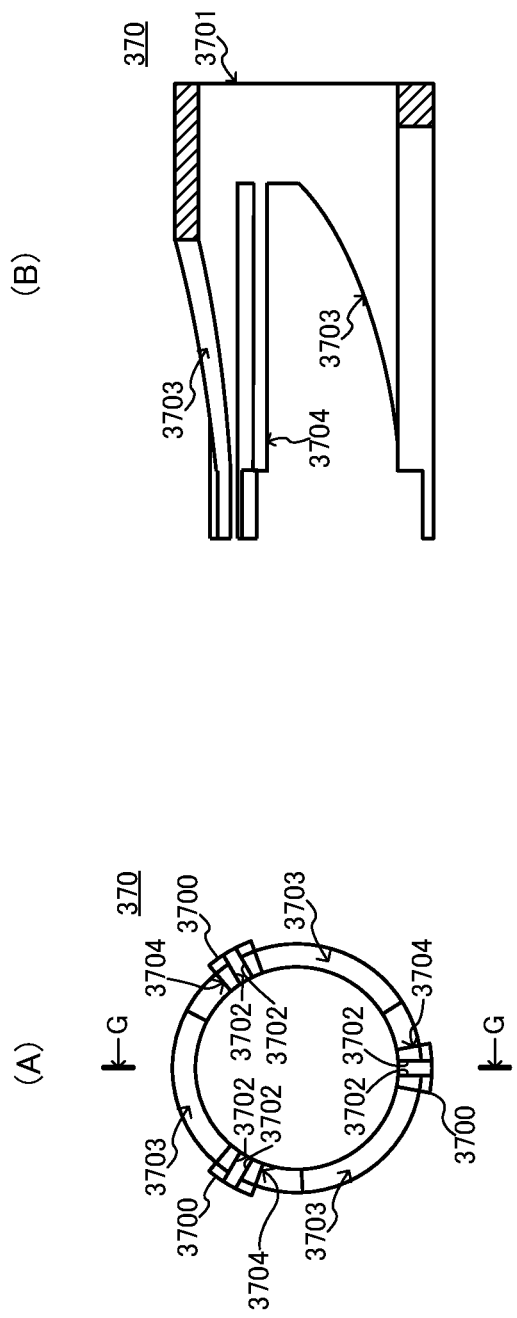
FIG. 18(A) is a front view of the liner member 370.
FIG. 18(B) is a G-G cross-sectional view of FIG. 18(A).

FIG. 18(A) is a front view of the liner member 370, and FIG. 18(B) is a G-G cross-sectional view of FIG. 18(A).

As illustrated in the figures, the liner member 370 to be housed in the large diameter region 3601 of the casing body member 300A, has a hollow cylindrical shape with an outer diameter larger than an inner diameter of the small diameter region 3600 of the casing body member 300A. Accordingly, when the liner member 370 is inserted, with the bottom surface 3701 foremost, into one opening 30 of the casing body member 300A, the bottom surface 3701 contacts with the stepped surface 3602 on the inner wall of the casing body member 300A and the liner member 370 is held in the large diameter region 3601 of the casing body member 300A. An outer periphery of the liner member 370 is provided with protrusions (the stopper parts) 3700 formed along the direction of the axis O, each corresponding to one of the liner member fixing grooves 3603 of the casing body member 300A. As described above, since each of the stopper parts 3700 is placed in the corresponding liner member fixing groove 3603 of the casing body member 300A, a contact between inner wall surfaces (opposing side wall surfaces) of each liner member fixing groove 3603 and the corresponding stopper part 3700 therein prevents the rotation of the liner member 370 about the axis O relative to the casing body member 300A.

An outer surface of the liner member 370 includes surfaces for forming, in the large diameter region 3601 of the casing body member 300A, an inner wall surface formation similar to that of the casing body member 300 illustrated in FIG. 9. In a detail, included are surfaces 3702 to be the side wall surfaces 35A of the respective guide grooves 35 in the large diameter region 3601 of the casing body member 300A, helical surfaces 3703 to be the respective cam faces 301 in the large diameter region 3601 of the casing body member 300A, and surfaces 3704 to be the respective stepped surface 306 each facing the corresponding cam face 301 in the large diameter region 3601 of the casing body member 300A.

For example, these members 300A, 370 and the aforementioned liner member 350 are assemble in the following way to create the casing 3A.

The stopper parts 3700 on the outer periphery of the liner member 370 is aligned with the respective liner member fixing grooves 3603 on the inner wall of the casing body member 300A, and at the same time, the liner member 370 is inserted, with the bottom surface 3701 foremost, into the opening 30 of the casing body member 300A; the liner member 370 is thereby located on the stepped surface 3602 of the inner wall of the casing body member 300A. The guide protrusions 53 of the friction disk 5 are aligned with the respective guide grooves 35 formed in the casing body member 300A by the surfaces 3702 of the liner member 370, and at the same time, this friction disk 5 is inserted into the opening 30 of the casing body member 300A. Then, the rotatable friction disk 6 is inserted into the opening 30 of the casing body member 300A so that the guide protrusions 63 on the outer periphery 62 of the rotatable friction disk 6 can be located on the respective cam faces 301 formed in the casing body member 300A by the helical surfaces 3703 of this liner member 370; the rotatable friction disk 6 is thereby stacked on the sliding surface 51 of the friction disk 5. Moreover, the guide protrusion 73 of the friction disk 7 are aligned with the respective guide grooves 35 formed in the casing body member 300A by the surfaces 3702 of the liner member 370, and at the same time, this friction disk 7 is inserted into the opening 30 of the casing body member 300A; thereby the boss part 75 of the friction disk 7 is sequentially inserted into the boss insertion hole 64 of the rotatable friction disk 6 and the boss insertion hole 54 of another friction disk 5 and the friction disk 7 is stacked on the sliding surface 61 of the rotatable friction disk 6.

Just as the casing body member 300 illustrated in FIG. 9, the liner member 350 is inserted, with the top end 357 of each liner part 352 foremost, into the casing body member 300A in the direction of the axis O, so that the stopper parts 353 of the liner member 350 are inserted into the respective guide grooves 35 formed in the casing body member 300A by the surfaces 3702 of the liner member 370. As a result for each liner part 352 of the liner member 350, the cam face 356 and the corresponding helical surface 3703 (the cam face 301) of the liner member 370 face keeping a predetermined distance from each other and the side 358 is positioned at a position facing the corresponding stepped surface 306 formed on the inner wall of the casing body member 300A by the surface 3704 of the liner member 370. Consequently, the each cam face 301 of the liner member 370 and the cam face 356 of the corresponding liner part 352 of the liner member 350 create one helical cam groove 33 with a predetermined width, on the inner wall of the casing body member 300A, and these cam grooves 33 hold therein the respective guide protrusions 63 on the outer periphery 62 of the rotatable friction disk 6. member 300, and these cam grooves 33 hold therein the respective guide protrusions 63 on the outer periphery 62 of the rotatable friction disk 6.

In this situation, in such a way that a space created between the branches of the bifurcated fixing member in snap-fit form is available as an alternative to the rod insertion hole to the inside of the damping mechanism holding space 20, each branch is inserted, until it projects out of one fixing member insertion hole 3605A toward the outside of the casing body member 300A, into the casing body member 300A through another fixing member insertion hole 3605B. The fixing members attached to the opening 30 of the casing body member 300A prevent the liner member 350 placed in the large diameter region 3601 or the like within the cylindrical member 360 from dropping out of one opening 30.

Then, the cover 361 with the end part 42 of the coil spring 40 fitted in the spring guide hole 36 becomes attached to an end part of the cylindrical member 360 so as to insert the end part 41 of the coil spring 40 into the opening 30A of the cylindrical member 360, and the threaded section 3611 on the inner periphery of the cover 361 becomes tightened onto the threaded section 3604 on the outer periphery of the end part of the cylindrical member 360. This causes the coil spring 40 to be housed within the damping mechanism holding space 20 while subjecting to preload between the bottom part of the cover 361 and the back surface 50 of the friction disk 5.

The housing with the cam grooves 33 formed by two types of the liner members 350, 370 on the inner wall is herein exemplified by the housing having the casing body member 300A of a two-piece structure with two types of the liner members 350, 370 placed therein and the bifurcated fixing member in snap-fit form (not illustrated in the figures); however the housing with the cam grooves 33 formed by two types of the liner members 350, 370 on the inner wall is not limited to the example but may include a bottomed cylindrical casing body member with an opening 30 at one end part, in which two types of the liner members 350, 370 are placed, and the cover 9 designed to be screwed into the opening 30 of this casing body member.

In the above embodiments, the stepped surface 87 provided on the outer periphery surface 88 of the push rod 8 is designed to push the two friction disks 5, 7 and the rotatable friction disk 6 interposed between these disks 5,7, as one unit, toward the bottom part 32 of the casing 3; however, without limitation of the above embodiments, a friction disk 7A having the boss part 75 with a bottomed hole as a rod insertion hole for insertion of the push rod may be used, so that the two friction disks 5, 7A and the rotatable friction disk 6 interposed between these disks 5, 7A may be pushed as one unit toward the bottom part 32 of the casing 3 by the front end part of the push rod. In such a case, as exemplified in FIG. 12, the push rod 8A with a ball joint 800 at a front end may be used and a ball seat 700 for holding a ball part 801 of this ball joint 800 to be rotatable may be fitted in the bottomed rod insertion hole of the boss part 75 of the friction disk 7A so that a swinging of the push rod 8A linked to the clutch pedal arm 10 capable of swinging about the rotation axis 12 can be absorbed.

FIG. 13(A) and FIG. 13(B) are respectively a front view and a right side view of the push rod 8A with the ball joint 800 attached to the front end face 86A.

This push rod 8A includes a shaft section 81A with the ball joint 800 attached to the front end face 86A, as an alternative to the aforementioned stepped shaft section 81. The ball part 801 of the ball joint 800 is flattened in the direction of the axis O on double sides, thereby being provided with two flattened surfaces 802 nearly parallel to each other on the outer peripheral surface so as to limit a swinging range of the push rod 8A.

Figure 14:
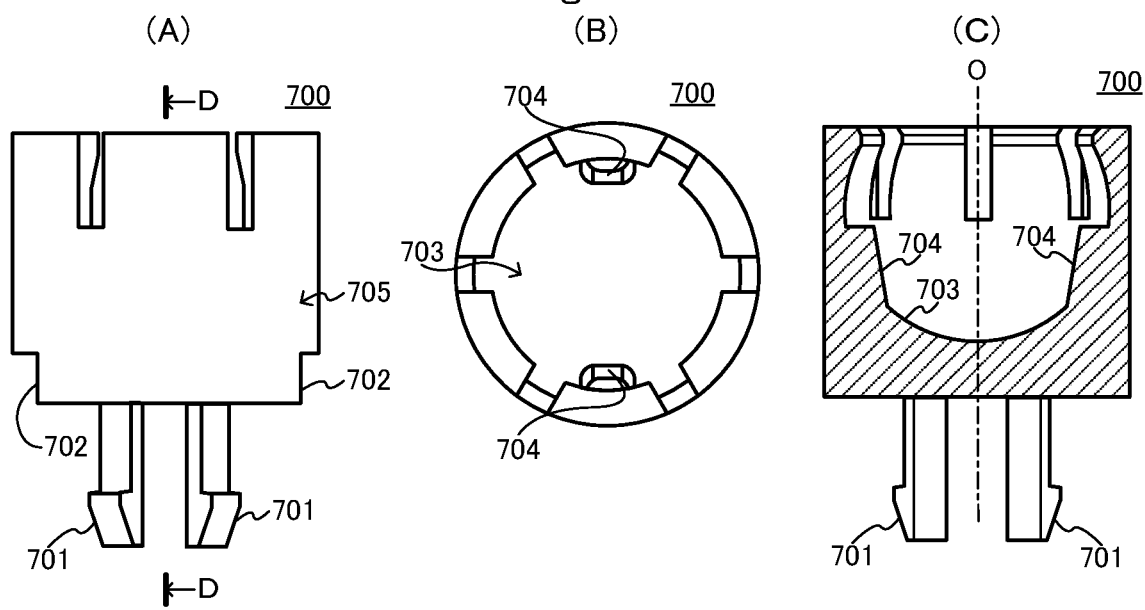
FIG. 14(A) and FIG. 14(B) are respectively a front view and a plan view of a ball seat 700 for holding a ball part 801 to be rotatable.
FIG. 14(C) is a D-D cross-sectional view of FIG. 14(A).
Figure 15:
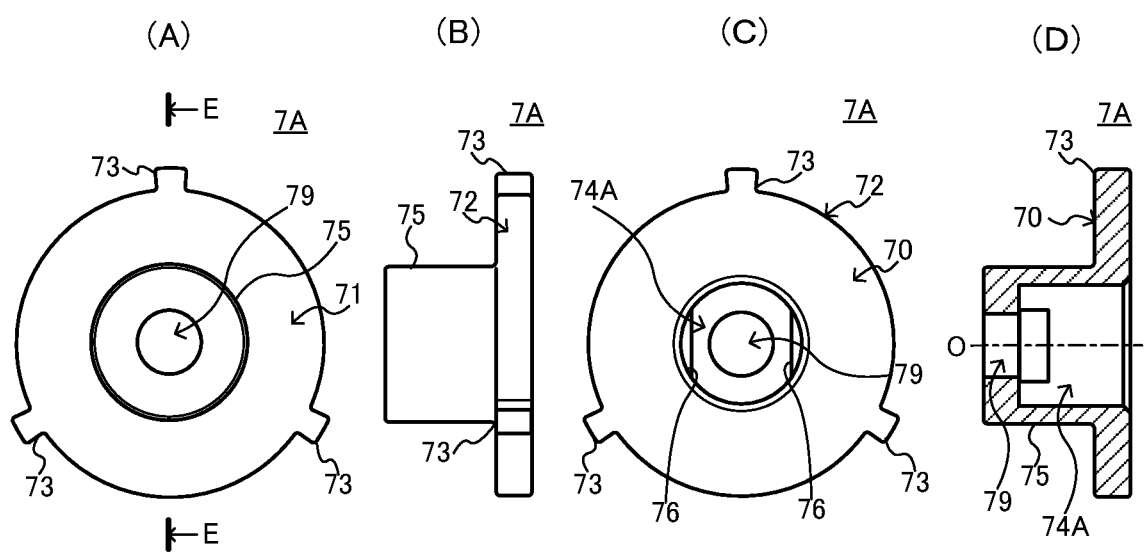
FIG. 15(A), FIG. 15(B), and FIG. 15(C) are respectively a front view, a right side view, and a back view, of the friction disk 7A within which the ball seat 700 is to be fitted.
FIG. 15(D) is an E-E cross-sectional view of FIG. 15(A).

FIG. 14(A) and FIG. 14(B) are respectively a front view and a plan view of the ball seat 700 for holding the ball part 801 to be rotatable, and FIG. 14(C) is a D-D cross-sectional view of FIG. 14(A). FIG. 15(A), FIG. 15(B), and FIG. 15(C) are respectively a front view, a right side view, and a back view, of the friction disk 7A within which the ball seat 700 is to be fitted, and FIG. 15(D) is an E-E cross-sectional view of FIG. 15(A).

As illustrated in the figures, a bottomed hole 74A within which the ball seat 700 is to be fitted is formed on the boss part 75 on a central area of the sliding surface 70 of the friction disk 7A, as an alternative rod insertion hole to the aforementioned rod insertion hole 74. An opening section 79 is formed in a bottom of this rod insertion hole 74A so as to engage with below-mentioned snap fit parts 701 provided on a bottom part of the ball seat 700. At least one flattened surface 76 in the direction of the axis O is defined in an inner peripheral surface of this rod insertion hole 74A.

The ball seat 700 to be fitted within the rod insertion hole 74A of the boss part 75 of the friction disk 7A, meanwhile, has a hollow cylindrical shape with one end opened, inside of which a sliding surface 703 in a substantial spherical shape is formed so as to hold the ball part 801 of the ball joint 800 to be rotatable.

In an outer peripheral surface 705 of the ball seat 700 (a surface facing the inner peripheral surface of the rod insertion hole 74A of the friction disk 7A), at least one flattened surface 702 facing the flattened surface 76 on the inner periphery of the rod insertion hole 74A of the friction disk 7A is defined in the direction of the axis O, and a contact between this flattened surface 702 and the flattened surface 76 on the inner periphery of the rod insertion hole 74A of the friction disk 7A restricts the ball seat 700 from rotating inside the rod insertion hole 74A of the friction disk 7A about the axis O. Moreover, the bottom of the ball seat 700 is provided with a plurality of the snap fit parts 701 (for example, four parts 701), and fitting the ball seat 700 into the rod insertion hole 74A of the friction disk 7A causes these snap fit parts 701 to be inserted into the opening section 79 at the bottom of the rod insertion hole 74A of the friction disk 7A and to engage with an edge around this opening section 79. This prevents the ball seat 700 from dropping out of the rod insertion hole 74A of the friction disk 7A.

Figure 12:
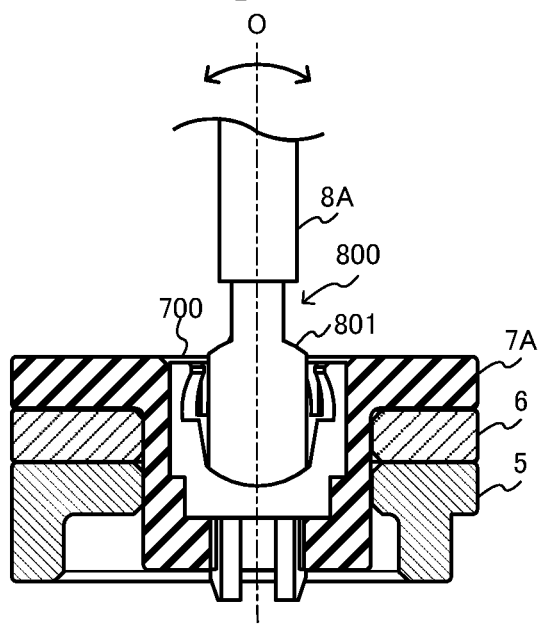
FIG. 12 is a cross-sectional view of a section where an end part of a push rod 8A and a friction disk 7A are coupled each other.

On the sliding surface 703 inside of the ball seat 700, protrusions 704 are formed at two opposite positions so as to project toward the axis O. As illustrated in FIG. 12, the ball part 801 of the ball joint 800 is fitted into the ball seat 700 so that the two flattened surfaces 802 on the outer periphery of the ball part 801 face these protrusions 704, thus causing the swinging of the push rod 8A to be restricted within the range of up to contact of each of the flattened surfaces 802 of the ball part 801 with the opposing protrusion 704 of the sliding surface 703 of the ball seat 700. Consequently, the swinging of the push rod 8A is absorbed to fall within this range.

In the embodiments, the small diameter section 84 in the shaft section 81 of the push rod 8 is inserted into the rod insertion hole 74 of the friction disk 7, the stepped surface 87 of the push rod 8 activates the three friction disks 5 to 7 as one unit in the direction of the axis O of the push rod 8 in response to a motion of the push rod 8, but is not limited thereto; for example, as an alternative to the use of the friction disk 7, an annular flange may be provided on the outer periphery of the push rod 8, resulting in this annular flange pushing the friction disks 5, 6 as one unit in the direction of the axis O of the push rod 8.

The embodiments gives an example where one coil spring 40 is provided as the elastic member 4, but any can be used as the elastic member 4 as far as it has an appropriate elastic coefficient and can urge the friction generating section 1 toward the cover 9 throughout the entire stroke of the push rod 8. For example, as the elastic member 4 may be used any elastic member(s) other than the coil spring 40, such as, but not limited to, rubber member or a plurality of disc springs stacked.

For some intended machines each to incorporate the damper 100, for example, an elastic member having non-linear property where an elastic coefficient varies depending on a displacement may be used as the elastic member 4, thus leading to a rapid change in a load on a hand or a foot of user at the time when the clutch pedal is depressed to the predetermined position. Non-limited examples of such an elastic member include combined springs with a nested structure where the aforementioned coil spring 40 is arranged inside or outside a coil spring that starts to be compressed between the friction generating section 1 and the bottom part 32 of the casing 3 at the time when the friction generating section 1 moves forward by a predetermined distance in the damping mechanism holding space 20, and an irregular pitch coil spring. According to this structure, a suitable load is given user's hand, foot, or the like during operation of operating part, and a rapid change in the load on user's hand, foot, or the like is caused at the time when the operating part is operated up to a predetermined position (at the time when the push rod 8 is displaced by a predetermined amount in the direction of its axis O), thereby enabling the user to be given tactile signals notifying of the movement of the operating part up to the predetermined position.

In the embodiments, the inner wall 31 of the casing 3 is provide with the three cam grooves 33 and the outer periphery 62 of the rotatable friction disk 6 is provided with the guide protrusions 63 as many as these cam grooves 33; however, it may suffice to provide on the inner wall 31 of the casing 3 at least one cam groove 33, and it may suffice to provide on the outer periphery 62 of the rotatable friction disk 6, at least one guide protrusion 63 to be fitted in any cam groove 33 of the inner wall 31 of the casing 3. Similarly, in the embodiments, the inner wall 31 of the casing 3 is provided with the three guide grooves 35 and each of the outer peripheries 52, 72 of the two friction disks 5, 7 is provided with the guide protrusions 53, 73 as many as these guide grooves 35; however, it may suffice to provide on the inner wall 31 of the casing 3 at least one guide groove 35, and it may suffice to provide on each of the outer peripheries 52, 72 of the two friction disks 5, 7, at least one guide protrusion 53, 73 to be fit in any guide groove 35 on the inner wall 31 of the casing 3.

In the embodiments, one friction disk 7 to be situated on the cover 9 side is provided with the boss part 75 and another friction disk 5 to be situated on the coil spring 40 side is provided with the boss insertion hole 54 for insertion of the boss part 75 projecting out of the boss insertion hole 64 of the rotatable friction disk 6, but conversely, one friction disk 7 to be situated on the cover 9 side may be provided with a boss insertion hole and another friction disk 5 to be situated on the coil spring 40 side may be provided with a boss part to be inserted into this boss insertion hole.

Figure 11:
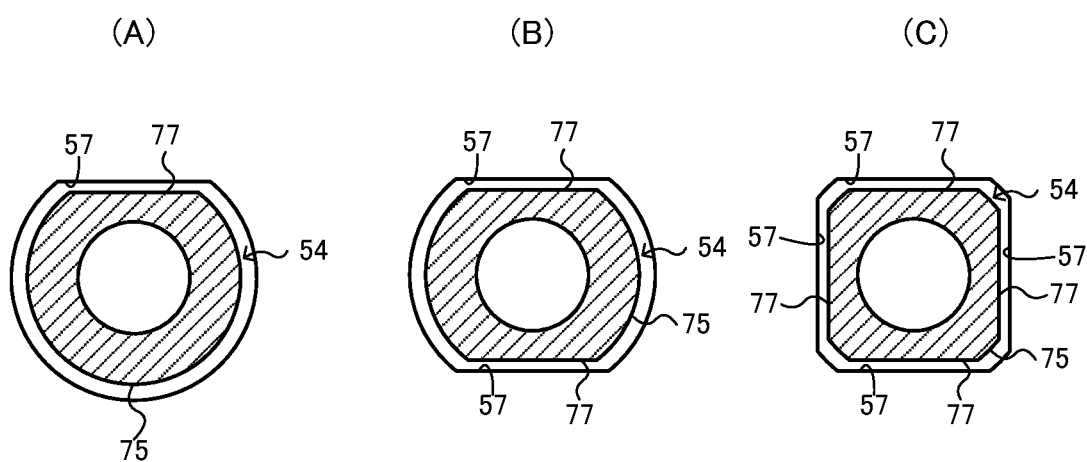
FIGS. 11(A) to (C) each are cross sectional view that illustrates an image example of how a boss part 75 of the friction disk 7 fits within a boss insertion hole 54 of the friction disk 5.

The two friction disks 5, 7 each may be provided with a detent for preventing relative rotation between these two friction disks 5, 7. As exemplified in FIG. 11(A) to (C), an outer peripheral surface of an end part of one boss part 75 of the friction disk 7 may be provided with at least one flattened surface 77 and an inner peripheral surface of the boss insertion hole 54 of another friction disk 5 may be provided with a flattened surface 57 to face the flattened surface 77 on the outer periphery of the end part (a part to be inserted into the boss insertion hole 54) of the boss part 75, thereby using contact between the opposite flattened surfaces 77, 57 to prevent a relative rotation between the two friction disks 5, 7. In the case of providing such a detent, the guide protrusions to be inserted into the guide grooves 35 on the inner wall 31 of the casing 3, 3A may be arranged on the outer periphery of at least one friction disk out of the two friction disks 5, 7. In the case of providing the annular flange on the outer periphery of the push rod 8 as an alternative to the use of the friction disk 7, the detent for the friction disk 5 with respect to the push rod 8 may be configured as follows, which is sufficient: for example, the outer peripheral surface of the push rod 8 may be provided with at least one flattened surface or at least one groove and the inner peripheral surface of the boss insertion hole 54 of the friction disk 5 may be provided with a flattened surface to face the flattened surface on the outer periphery of the push rod 8 or a protrusion to be inserted into the groove on the outer periphery of the push rod 8.

In the embodiments, throughout the cam grooves 33 provided on the inner wall 31 of the casing 3, its groove width remains a constant, but it may not always be necessary to be in this manner. For example, the cam groove 33 may include a region which varies gradually in groove width. This causes a difference between the inclination angles θ (with respect to the direction of the axis O) of the paired helical cam faces (side surfaces of a groove) which face each other to form the groove, that is, a helical cam face for guiding during the forward stroke the guide protrusion 63 formed on the outer periphery 62 of the rotatable friction disk 6 and a helical cam face for guiding during the backward stroke, and consequently the rotating speed of the rotatable friction disk 6 may vary between in the forward stroke and in the backward stroke.

An inclination angle θ of each of the cam grooves 33 provided on the inner wall 31 of the casing 3 above remains a constant, but it may not always be necessary to be in this manner. Pattern of the cam grooves 33 in the inner wall 31 of the casing 3 may be changed according to a required rotating speed of the rotatable friction disk 6. For example, the inner wall 31 of the casing 3 may be provided with the cam groove 33 including sections having the inclination angles θ different from each other, and the rotating speed of the rotatable friction disk 6 is thereby caused to change during a stroke, or the inner wall 31 of the casing 3 may be provided with the cam groove 33 having the inclination angle θ that vary gradually, and the rotating speed of the rotatable friction disk 6 is thereby caused to change gradually during a stroke.

In the embodiments, the friction generating section 1 includes the three friction disks 5 to 7 stacked in the direction of the axis O, but is not limited thereto and may include four or more friction disks stacked in the direction of the axis O in such a way that use of cam enables the adjacent friction disks to rotate relative to each other.

REFERENCE SIGNS LIST

1: friction generating section, 2: housing, 3, 3A: casing, 4: elastic member, 5 to 7, 7A: friction disk, 8, 8A: push rod, 9: cover, 10: clutch pedal arm, 12: rotation axis of the clutch pedal arm, 13: bolt, 14, 15: nut, 16: clevis joint, 17: bracket, 20: damping mechanism holding space, 30: opening of the casing, 31: inner wall of the casing, 32: bottom part of the casing, 33: helical cam groove on the inner wall of the casing, 34: threaded portion of the opening of the casing, 35: guide groove on the inner wall of the casing, 36: spring guide hole on the bottom part of the casing, 40: coil spring, 41, 42: end part of the coil spring, 51: sliding surface of the friction disk, 52: outer periphery of the friction disk, 53: guide protrusion of the friction disk, 54: boss insertion hole of the friction disk, 60, 61: sliding surface of the friction disk, 62: outer periphery of the friction disk, 63: guide protrusion on the outer periphery of the friction disk, 64: boss insertion hole of the friction disk, 70: sliding surface of the friction disk, 71: back surface of the friction disk, 72: outer periphery of the friction disk, 73: guide protrusion of the friction disk, 74, 74A: rod insertion hole of the friction disk, 75: boss part of the friction disk, 76: flattened surface in the inner periphery of the rod insertion hole of the friction disk, 81, 81A: shaft section, 82: pedal arm connecting section, 83: large diameter section in the shaft section, 79: opening section on the bottom of bottomed rod insertion hole, 84: small diameter section in the shaft section, 85, 86, 86A: end face of the push rod, 87: stepped surface, 88: outer peripheral surface of the shaft section, 89: threaded hole, 90: through hole (rod insertion opening) of the cover, 91: back surface of the cover, 92: threaded portion on the outer periphery of the cover, 100: damper, 300, 300A: casing body member, 301: cam face, 303: large diameter cylindrical surface region, 304: small diameter cylindrical surface region, 350: liner member, 351: base part, 352: liner part, 353: stopper part, 354: surface of the base part, 356: cam face, 357: top end of the liner part, 360: cylindrical member, 361: cover, 370: liner member, 700: ball seat, 701: snap fit part, 702: flattened surface on the outer periphery of the ball seat, 703: sliding surface, 704: protrusion in the sliding surface, 705: outer peripheral surface of the ball seat, 800: ball joint, 801: ball part, 802: flattened surface in the outer periphery of the ball part, 3600: small diameter region, 3601: large diameter region, 3602: stepped surface, 3603: liner member fixing groove, 3604: threaded section, 3605A, 3605B: fixing member insertion hole, 3610: opening of the cover, 3611: threaded section on inner periphery of cover, 3612: bottom part of the cover, 3700: stopper part, 3701: bottom surface of the liner member.

The invention claimed is:

1. A damper for damping a movable member along an axis, the damper comprising:
    a housing in a cylindrical shape, having an inner wall configured to surround the movable member about the axis, the inner wall being provided with a cam groove in a helical form winding about the axis and having a guide groove along the axis;
    a friction generating section placed in the housing and configured to move with the movable member along the axis; and
    an elastic member placed in the housing, being to urge the friction generating section by an elastic force depending on an amount of displacement of the movable member, in a direction of pressing the friction generating section against the movable member,
    the friction generating section comprising:
        a first friction member configured to be displaced toward the elastic member in response to a force from the movable member;
        a second friction member configured to be displaced toward the elastic member to compress the elastic member; and
        a third friction member having an outer peripheral surface provided with a guide protrusion inserted in the cam groove, the third friction member configured to move with the first and second friction members along the axis while being pressed between the first and second friction members, the third friction member in motion configured to be rotated about the axis by the guide protrusion guided through the cam groove, the third friction member being provided with a through hole at a position which the axis passes through,
    wherein one friction member of the first and second friction members has a boss part inserted in the through hole of the third friction member, another friction member is provided with a boss insertion hole, the boss part is inserted into the boss insertion hole through the through hole of the third friction member, and an outer peripheral surface of the boss part and an inner peripheral surface of the boss insertion hole include opposing surfaces configured to contact with each other to prevent a relative rotation between the first and second friction members, and
    at least one friction member of the first and second friction members has a guide protrusion inserted in the guide groove so as to be guided through the guide groove while preventing a rotation of the first and second friction members relative to the housing.

2. A damper according to claim 1,
    wherein the housing has on the inner wall a pair of cam faces in helical, and the cam faces face each other to form the cam groove, and
    the pair of the cam faces have different inclination angles relative to a direction of the axis.

3. A damper according to claim 1,
    wherein the housing comprises:
    a casing body member in cylindrical shape, having an inner wall being provided with a stepped surface in helical form surrounding the axis as a first cam face; and
    a liner member placed in the casing body member along the inner wall of the casing body member,
    wherein the liner member comprises a second cam face faces keeping a distance away from the first cam face in the inner wall of the casing body member, and the cam groove is formed between the second cam face and the first cam face in the inner wall of the casing body member, and
    wherein the cam groove of the housing is formed by the first cam face of the casing body member in cylindrical shape and the second cam face of the liner member.

4. A damper according to claim 1,
    wherein the housing comprises:
    a casing body member,
    a first liner member having a first cam face in a helical form, and being placed inside the casing body member along the inner wall of the casing body member so that the first cam face surrounds the axis; and
    a second liner member having a second cam face in a helical form, and being placed in the casing body member along the inner wall of the casing body member so that the second cam face faces keeping a distance away from the first cam face, the cam groove being formed between the second cam face and the first cam face of the first liner member, and
    wherein the cam groove of the housing is formed by the first cam face of the first liner member and the second cam face of the second liner member.

5. A damper according to claim 1, wherein the movable member comprises a ball joint, and
    wherein the first friction member comprises a ball seat holding a ball part of the ball joint to be rotatable.

6. A damper for damping a movable member along an axis, the damper comprising:
    a housing in a cylindrical shape, having an inner wall configured to surround the movable member about the axis, the inner wall being provided with a cam groove in a helical form winding about the axis, the housing comprising:
    a casing body member in cylindrical shape, having an inner wall being provided with a stepped surface in helical form surrounding the axis as a first cam face; and
    a liner member placed in the casing body member along the inner wall of the casing body member, the liner member comprising a second cam face faces keeping a distance away from the first cam face in the inner wall of the casing body member, the cam groove being formed between the second cam face and the first cam face in the inner wall of the casing body member,
wherein the cam groove of the housing is formed by the first cam face of the casing body member in cylindrical shape and the second cam face of the liner member;
a friction generating section placed in the housing and configured to move with the movable member along the axis; and
an elastic member placed in the housing, being to urge the friction generating section by an elastic force depending on an amount of displacement of the movable member, in a direction of pressing the friction generating section against the movable member,
the friction generating section comprising:
a first friction member configured to be displaced toward the elastic member in response to a force from the movable member;
a second friction member configured to be displaced toward the elastic member to compress the elastic member; and
a third friction member having an outer peripheral surface provided with a guide protrusion inserted in the cam groove, the third friction member configured to move with the first and second friction members along the axis while being pressed between the first and second friction members, the third friction member in motion configured to be rotated about the axis by the guide protrusion guided through the cam groove.

7. A damper according to claim 6,
wherein the inner wall of the housing further has a guide groove along the axis, and
wherein the outer peripheral surfaces of the first and second friction members each have a guide protrusion inserted in the guide groove so as to be guided through the guide groove.

8. A damper according to claim 6, wherein the first cam face and the second cam face have different inclination angles relative to a direction of the axis.

9. A damper for damping a movable member along an axis, the damper comprising:
a housing in a cylindrical shape, having an inner wall configured to surround the movable member about the axis, the inner wall being provided with a cam groove in a helical form winding about the axis, the housing comprising:
a casing body member;
a first liner member having a first cam face in a helical form, and being placed inside the casing body member along the inner wall of the casing body member so that the first cam face surrounds the axis; and
a second liner member having a second cam face in a helical form, and being placed in the casing body member along the inner wall of the casing body member so that the second cam face faces keeping a distance away from the first cam face, the cam groove being formed between the second cam face and the first cam face of the first liner member,
wherein the cam groove of the housing is formed by the first cam face of the first liner member and the second cam face of the second liner member;
a friction generating section placed in the housing and configured to move with the movable member along the axis; and
an elastic member placed in the housing, being to urge the friction generating section by an elastic force depending on an amount of displacement of the movable member, in a direction of pressing the friction generating section against the movable member,
the friction generating section comprising:
a first friction member configured to be displaced toward the elastic member in response to a force from the movable member;
a second friction member configured to be displaced toward the elastic member to compress the elastic member; and
a third friction member having an outer peripheral surface provided with a guide protrusion inserted in the cam groove, the third friction member configured to move with the first and second friction members along the axis while being pressed between the first and second friction members, the third friction member in motion configured to be rotated about the axis by the guide protrusion guided through the cam groove.

10. A damper according to claim 9,
wherein the inner wall of the housing further has a guide groove along the axis,
wherein the outer peripheral surfaces of the first and second friction members each have a guide protrusion inserted in the guide groove so as to be guided through the guide groove.

11. A damper according to claim 9, wherein the first cam face and the second cam face have different inclination angles relative to a direction of the axis.

12. A damper for damping a movable member along an axis, the damper comprising:
a housing in a cylindrical shape, having an inner wall configured to surround the movable member about the axis, the inner wall being provided with a cam groove in a helical form winding about the axis;
a friction generating section placed in the housing and configured to move with the movable member along the axis; and
an elastic member placed in the housing, being to urge the friction generating section by an elastic force depending on an amount of displacement of the movable member, in a direction of pressing the friction generating section against the movable member,
the friction generating section comprising:
a first friction member configured to be displaced toward the elastic member in response to a force from the movable member, the first friction member comprising a ball seat;
a second friction member configured to be displaced toward the elastic member to compress the elastic member; and
a third friction member having an outer peripheral surface provided with a guide protrusion inserted in the cam groove, the third friction member configured to move with the first and second friction members along the axis while being pressed between the first and second friction members, the third friction member in motion configured to be rotated about the axis by the guide protrusion guided through the cam groove, wherein the movable member comprises a ball joint, and
wherein the ball seat is configured to hold a ball part of the ball joint to be rotatable.

13. A damper according to claim 12,
wherein the housing has on the inner wall a pair of cam faces in helical, and the cam faces face each other to form the cam groove, and
wherein the pair of the cam faces have different inclination angles relative to a direction of the axis.

14. A damper according to claim 12, wherein:
the inner wall of the housing further has a guide groove along the axis, the outer peripheral surfaces of the first and second friction members each have a guide protrusion inserted in the guide groove so as to be guided through the guide groove.

* * * * *